United States Patent
Bricaud et al.

(10) Patent No.: US 7,106,303 B2
(45) Date of Patent: Sep. 12, 2006

(54) TRACKBALL CONTROL DEVICE

(75) Inventors: Herve Guy Bricaud, Dole (FR); David Ferraton, Crissey (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 435 days.

(21) Appl. No.: 10/661,882

(22) Filed: Sep. 12, 2003

(65) Prior Publication Data

US 2004/0095324 A1    May 20, 2004

Related U.S. Application Data

(63) Continuation-in-part of application No. PCT/EP02/02778, filed on Mar. 13, 2002.

(30) Foreign Application Priority Data

Mar. 16, 2001   (FR) .................................. 01 03579

(51) Int. Cl.
*G09G 5/08* (2006.01)
(52) U.S. Cl. ................... 345/167; 74/471 XY
(58) Field of Classification Search ................ 345/156, 345/157, 163, 164, 167, 184; 74/471 XY
See application file for complete search history.

(56) References Cited

U.S. PATENT DOCUMENTS

| | | | |
|---|---|---|---|
| 5,926,167 A | | 7/1999 | Niitsuma |
| 5,977,953 A | * | 11/1999 | Tseng .......................... 345/164 |
| 6,433,773 B1 | * | 8/2002 | Hasuda ......................... 345/156 |
| 6,909,422 B1 | * | 6/2005 | Yokoji et al. ................ 345/167 |
| 2005/0184957 A1 | * | 8/2005 | Bricaud et al. ............... 345/157 |

FOREIGN PATENT DOCUMENTS

| | | |
|---|---|---|
| DE | 9419148.4 | 3/1995 |
| EP | 1073004 A2 | 1/2001 |
| EP | 1073004 A3 | 3/2002 |

* cited by examiner

*Primary Examiner*—Amr A. Awad
*Assistant Examiner*—Steven E. Holton
(74) *Attorney, Agent, or Firm*—Peter Van Winkle

(57) ABSTRACT

A trackball device in which the exposed top of a trackball (30) can be moved to pivot a pair of coding shafts (32L, 32T) about perpendicular axes, with control signal generators that detect such pivoting used to control a function such as a cursor on a screen. The control signal generator associated with each coding shaft includes a multi-toothed pinion (44L, 44T) fixed to the coding shaft and a deflectable rod (70L, 70T) lying between a pair of teeth of the pinion. When the coding shaft and pinion turn, the deflectable rod is deflected until the pinion tooth passes by it and the rod springs back to its original vertical position, where the next tooth can again deflect it. A rod deflection sensor detects every rod deflection and its direction to provide signals indicating the direction and extent of turning of the trackball. The trackball, coding shafts and other parts lie in a housing (22). A flat flexible cable (28) projects through a slit in the housing and lies on the bottom wall of the housing. A cable portion or span within the housing has exposed contacts that engage terminals of electronic components such as the deflection rod sensors.

11 Claims, 44 Drawing Sheets

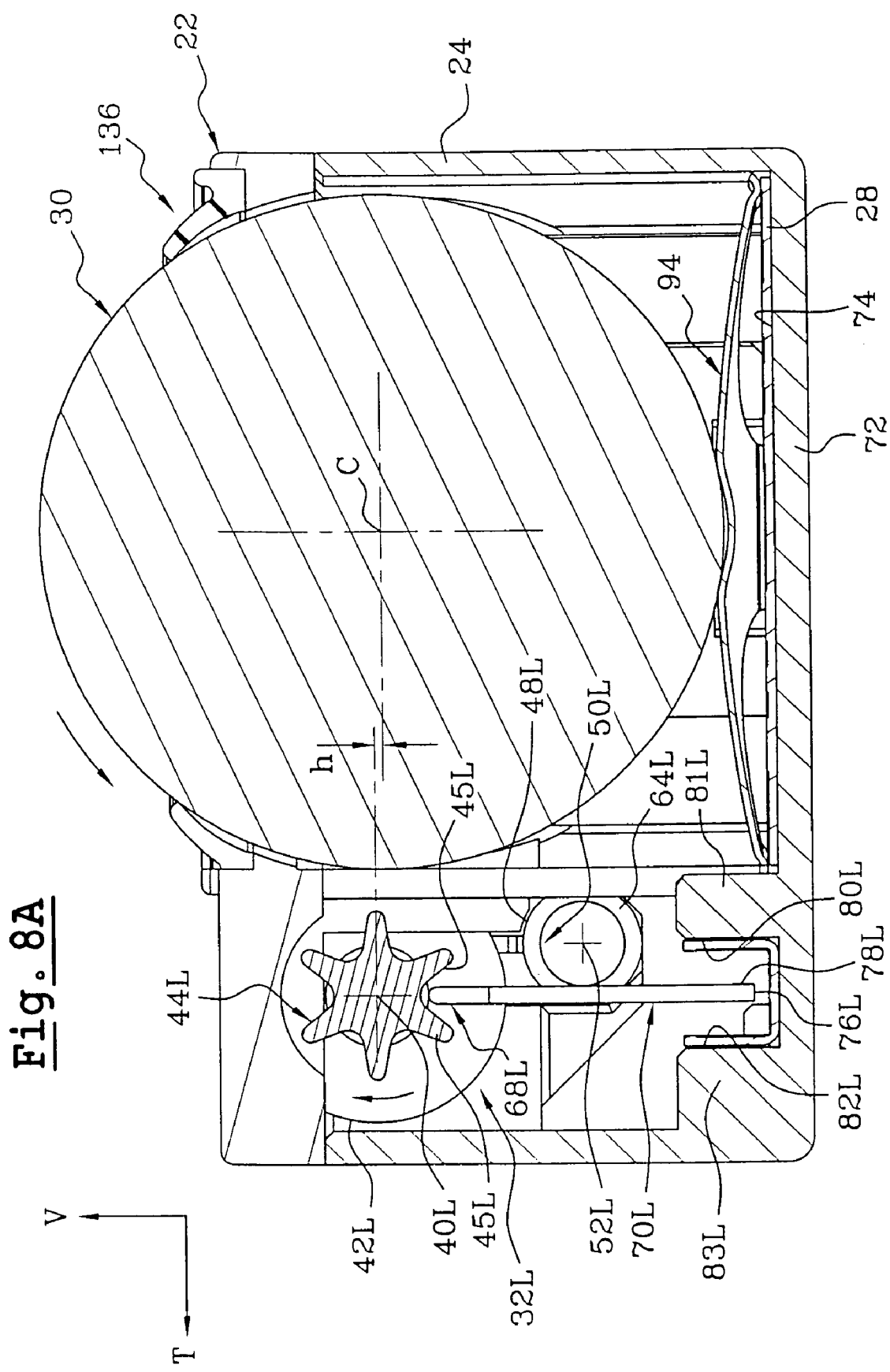

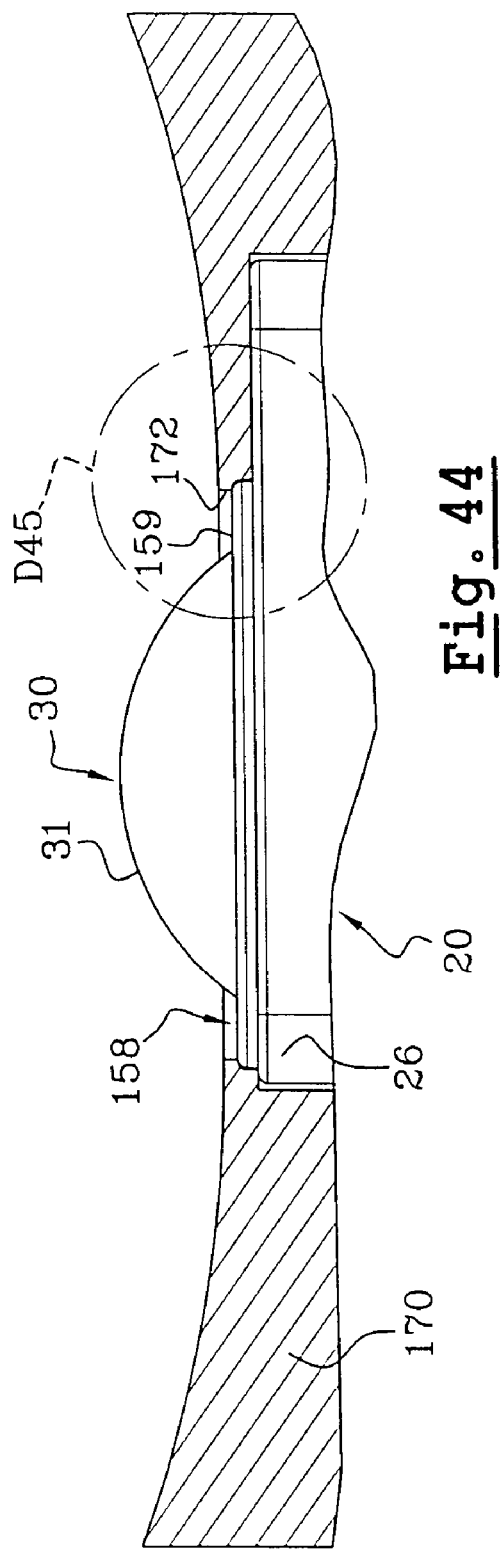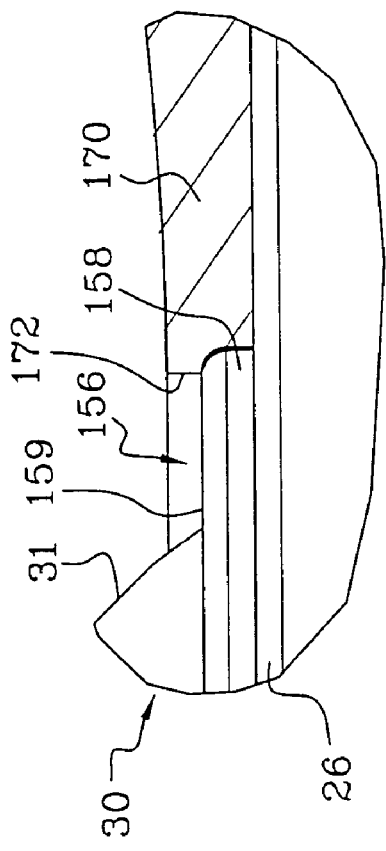

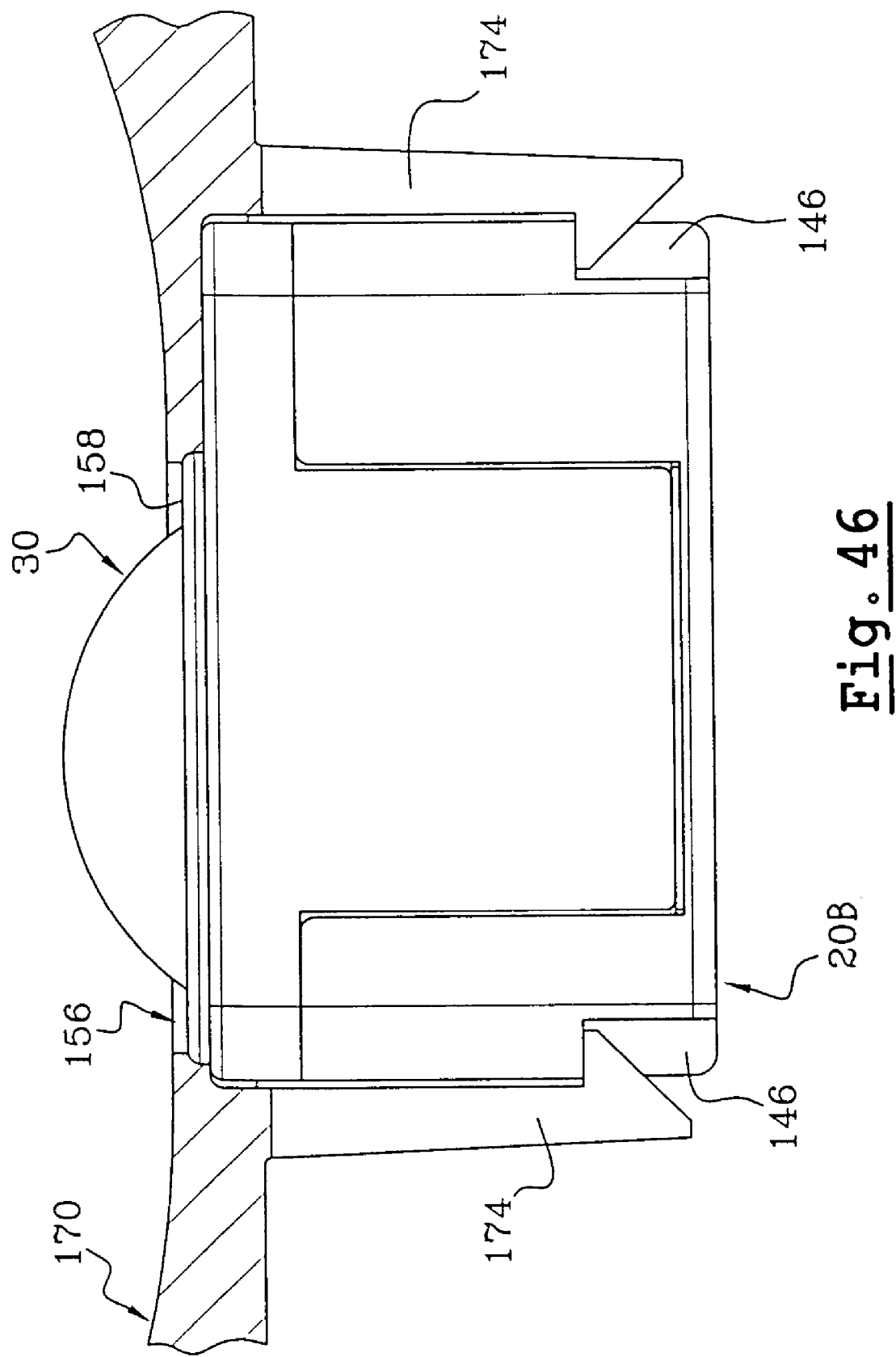

TRACKBALL CONTROL DEVICE

CROSS-REFERENCE

This is a continuation-in-part of PCT application PCT/EP02/02778 filed Mar. 13, 2002, which claims priority from French application 0103579 filed Mar. 16, 2001.

BACKGROUND OF THE INVENTION

A miniature (e.g. 12 mm long and wide) trackball control device includes a ball with an exposed top that can be manually moved to turn the ball about horizontal axes. Two coding shafts that are rotatably mounted about perpendicular horizontal axes, each turns in proportion to rotation of the ball about its corresponding axis. A control signal generator detects rotation of each coding shaft to generate control signals. In one application, the control signals move a cursor up and down or from side to side on a screen, such as a screen of a portable telephone.

Various designs have been proposed for signal generators that generate signals indicating the amount and direction of rotation of each of two coding shafts. Some factors in the choice of a signal generator are its reliability, whether or not it consumes electricity in its standby or rest state, and its complexity and cost. The ease of connection of the signal generators to an electronic device that uses the signals such as an electronic display on which the cursor image moves, is also important.

In many applications it is desirable to provide an entry switch or button which the user presses in order to enter a choice, as to enter a choice when a cursor has reached a particular position on the screen by manipulation of the ball. This can be accomplished by depressing the ball to operate a switch.

A trackball control device of low cost and reliable design would be of value, especially if the signal generators for detecting rotation of the coding shafts and the connection of the signal generator with another electronic device such as a display, were of reliable and low cost design.

SUMMARY OF THE INVENTION

In accordance with one embodiment of the present invention, a trackball control device is provided which is of simple and reliable construction. The control device is of the type that includes two coding shafts rotatable about perpendicular axes and each engaged with the ball to be turned. Apparatus for detecting rotation of each coding shaft includes a pinion having multiple teeth and fixed to the shaft. A deflectable rod has a part that lies between a pair of teeth and is resiliently deflected in one direction or the other when the pinion and coding shaft turn. When the shaft turns far enough for a pinion tooth to lose engagement with the rod, the rod springs back to its original position, to be again deflected by the next tooth. A detector detects repeated deflections of the deflectable rod and generates electrical signals indicating such rotation.

A device for detecting deflection of the deflectable rod is formed by a pair of contacts on opposite sides of a far end of the deflectable rod, which each can be engaged by the rod when it is deflected. The rod is supported by a spring, as by forming the rod as part of a wire that forms a spring. The rod can be formed at one end of the spring while the opposite end of the spring is connected to a circuit, so that a circuit is completed when the rod is deflected so its far end moves against one of the contacts of a detector.

The connection of the trackball control device to another electronic device such as a cursor display, is through a flat flexible cable. An end portion or span of the cable extends through a slit of the housing of the trackball control device and lies against a flat bottom wall of the housing. The end portion of the cable is devoid of its upper insulation sheet and has contact pads that are exposed so electrical terminals of the control device can be readily pressed against and/or soldered to such contact pads of the cable. Tabs of the cable end portion can be bent upward and placed against an upwardly-projecting lug in the bottom wall to provide a contact that resists sideward deflection.

The novel features of the invention are set forth with particularity in the appended claims. The invention will be best understood from the following description when read in conjunction with the accompanying drawings.

BRIEF DESCRIPTION OF THE DRAWINGS

FIGS. 5–8A and 9 are sectional views of the control device of FIG. 1 taken through the vertical sectional planes 5—5 to 9—9, respectively that are indicated in FIG. 4 and in which the contact rods are shown in their stable vertical rest positions.

FIG. 44 is an enlarged view of the upper portion of a control device of another embodiment of the invention.

FIG. 45 is an enlarged view of the D45 of FIG. 44.

FIG. 46 is a sectional view of the device of FIG. 44 showing means for holding the trackball under the cover element.

DESCRIPTION OF THE PREFERRED EMBODIMENT

Figure 1:
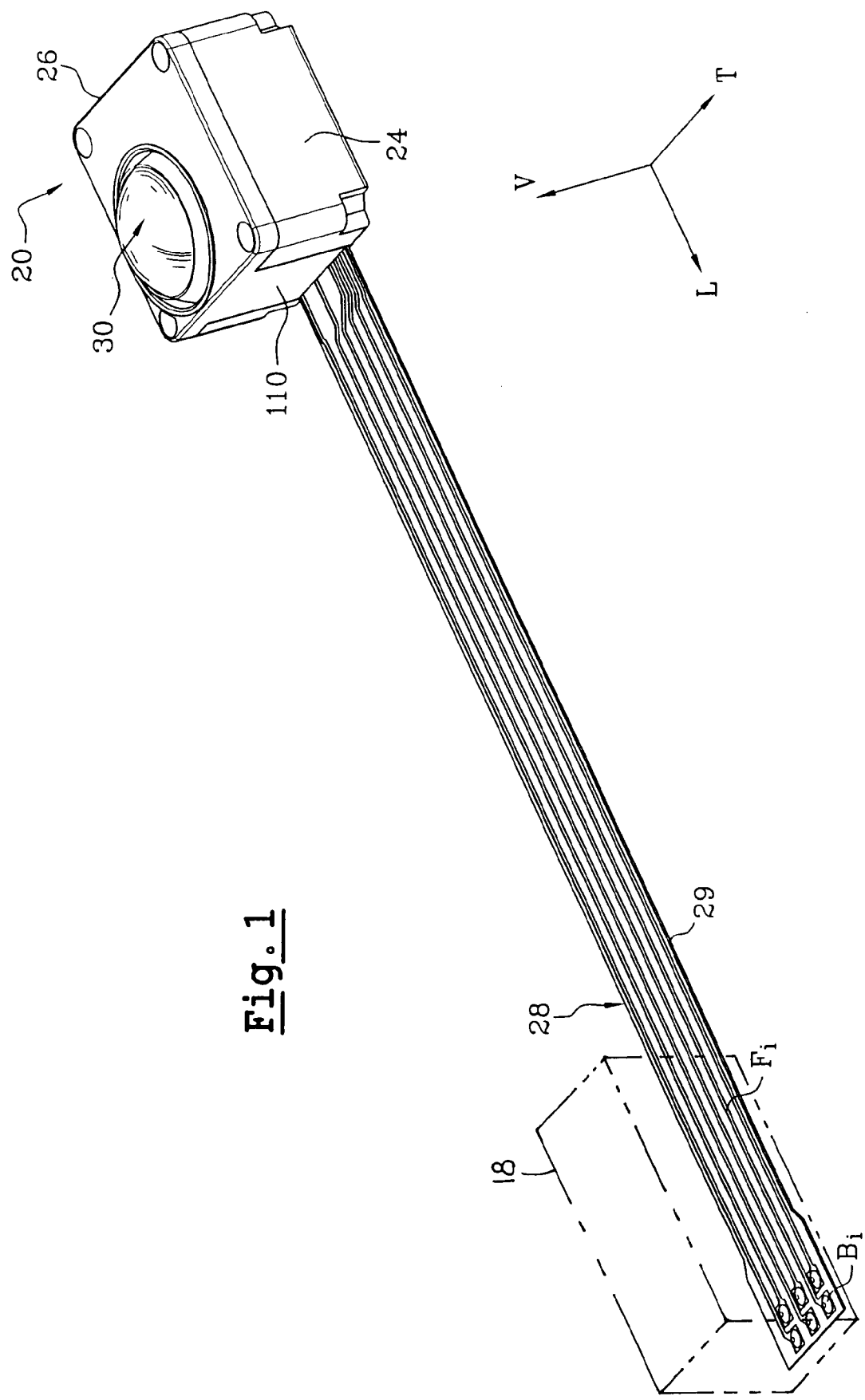
FIG. 1 is an isometric view of a control device of the invention showing its connection with a flat flex cable.

FIG. 1 illustrates a trackball control device 20 with a trackball 30 that can be turned about horizontal axes to generate electrical signals. The signals operate a second electronic device indicated at 18, which is a display. A flat flex cable 28 connects the devices.

The trackball control device 20 (FIG. 2) comprises a housing 22 of substantially right-angled parallelepipedal shape. The housing is formed of a main lower part 24 which accommodates the main components of the device 20, and an upper part forming a cover 26. The control ball or sphere 30 is frictionally engaged with two orthogonal coding shafts 32L, 32T, each of which is associated with a signal generator. The two shafts and the signal generators are of an overall symmetric design, and arranged symmetrically with respect to a vertical plane of symmetry corresponding to the line 6—6 of FIG. 4 on which the center C of the ball 30 lies. Arrows L and T designate perpendicular longitudinal and transverse (or lateral) directions, which are both indicated to extend horizontal in the figures, while arrow V (FIG. 2) designates vertical directions.

Figure 13:
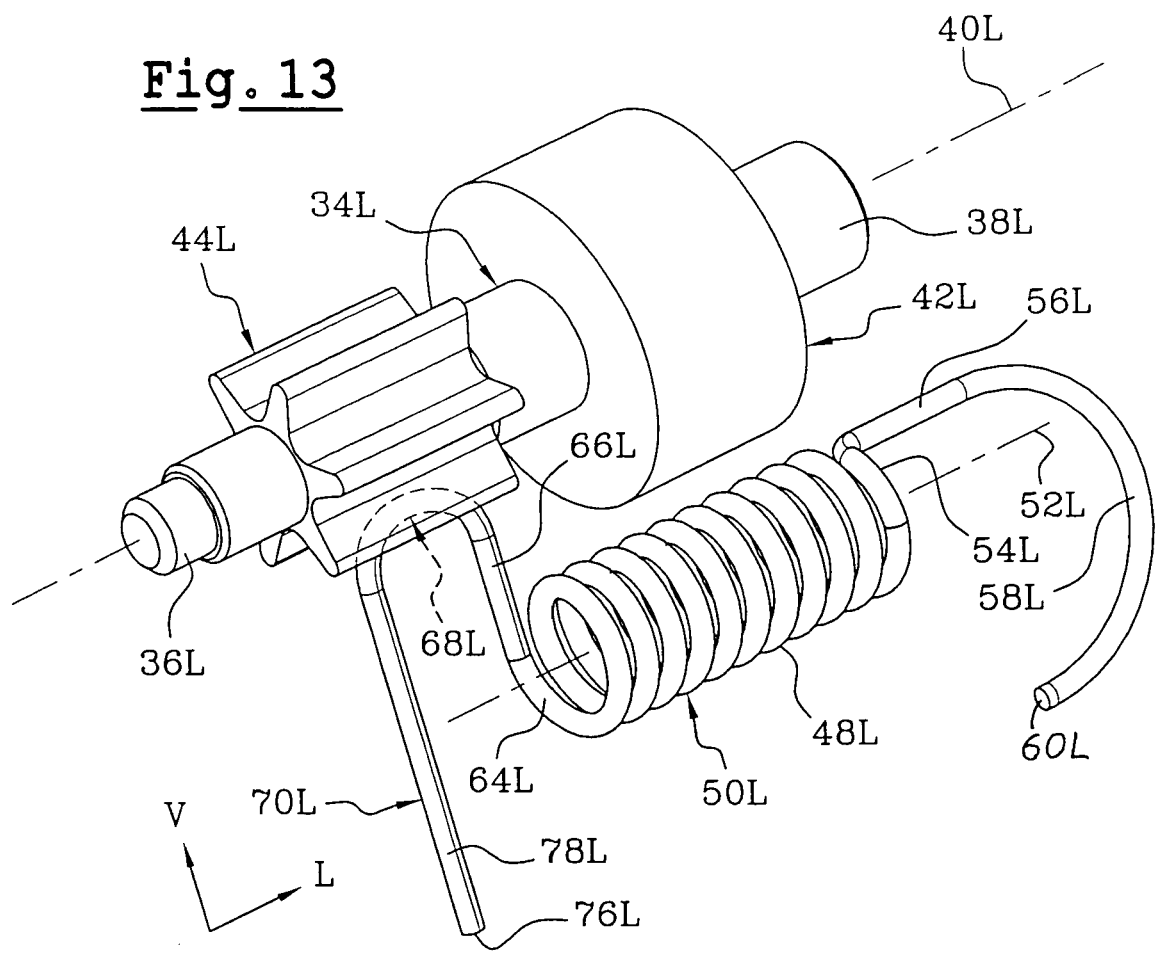
FIG. 13 is an isometric view of a coding shaft and a spring that includes a deflectable rod, of a control signal generator.
Figure 14:
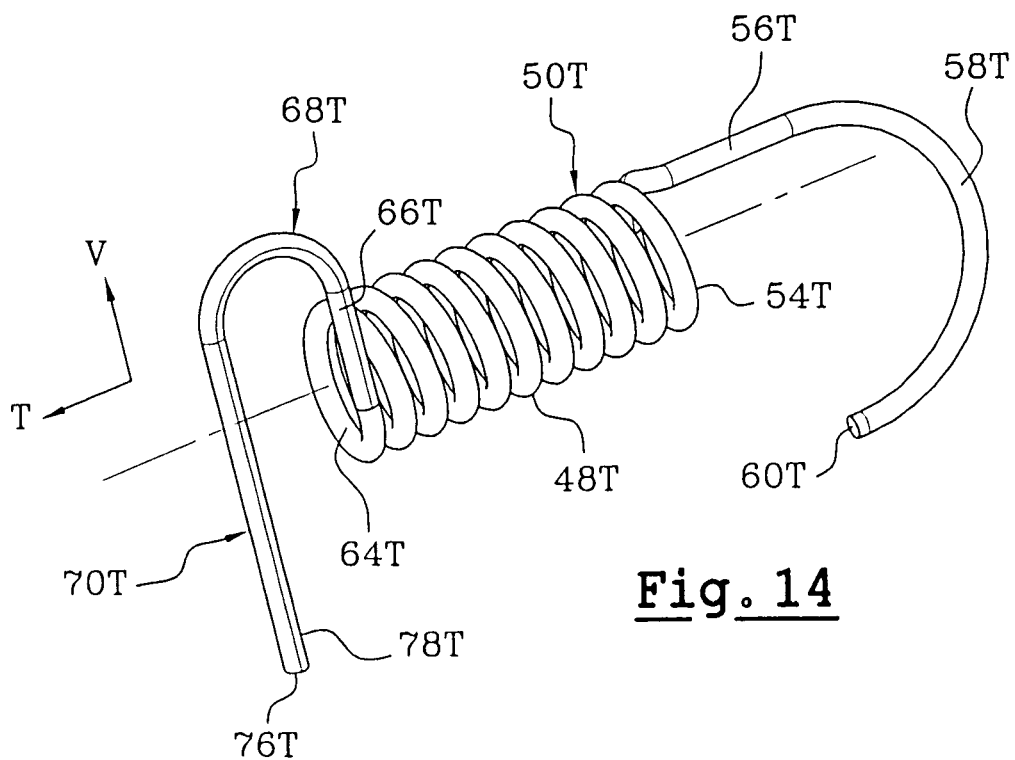
FIG. 14 is an isometric view of the other spring of the control device.

Each coding shaft 32L, 32T comprises a stepped cylindrical body 34L (FIGS. 2 and 13–14), 34T. Each body has a small diameter end 36L, 36T and a large diameter end 38L, 38T. Each shaft can rotate in opposite directions in the housing 22 about an axis 40L, 40T of rotation. The axes are perpendicular and lie in a horizontal plane. Each body 34L, 34T comprises a drive drum or roller 42L, 42T whose peripheral surface is frictionally engaged with the surface of the ball 30. Each body also has a toothed coding wheel, or pinion 44L, 44T, which is fixed on the axis of the corresponding body 34L, 34T.

The lower or main part 24 (FIGS. 5, 7) of the housing 22 forms upwardly opening recesses 46L, 46T of semi-cylindrical general shape 46L, 46T (FIGS. 10, 12) that open upward and serve as shaft bearings. Each recess has a prismatic profile to limit friction while ensuring guidance along linear ridges. Each recess has a portion that receives the cylindrical main body 48L, 48T (FIG. 13) of a torsional spiral spring 50L, 50T made of metal wire wound around an axis 52L, 52T.

The last turn 54L, 54T of each spring is extended by a wire strand 56L, 56T extending parallel to the axis 52L, 52T. Each strand 56L, 56T has a free end 58L, 58T which is bent into a semi-circular shape part. That part extends downward in a vertical plane in such a way as to be received vertically in a complementary slot 62L, 62T (FIG. 19) which is formed in the lower part 24 of the housing and open vertically towards the top. The end or strand such as 58L is in constant electrical connection with a circuit by constant engagement with a common pad of the flex cable.

The first turn 64L, 64T (FIG. 13) of the spring 50L, 50T, axially opposite the last turn 54L, 54T, is extended upwards by a vertical joining wire strand 66L, 66T. Each strand 66L, 66T is joined to a vertical moveable contact rod 70L, 70T by a 180° bent upper strand 68L, 68T. The upper or proximal end such as 68L can be deflected by the pinion 44L, while the lower end, or far end, or distal end 78L moves against one of two contact pads, depending upon the direction of pinion rotation and therefore proximal end deflection. Each joining strand 66L, 66T lies in a vertical plane substantially tangential to the periphery of the multi-turn cylindrical body 48L, 48T of the spring 50L, 50T.

The vertical orientation of the contact, or deflectable rod 70L, 70T in the rest position (FIGS. 8A and 9) results from the design of each spring 50L, 50T with its contact rod 70L, 70T. The spring bent strand 58L, 58T (FIG. 19) is guided vertically in the slot 62L, 62T to prevent its unlimited rotation.

The lower part 24 of the housing is of hollow right-angled parallelepipedal general shape and has a bottom wall, or bottom 72 (FIG. 5) with an upper face 74 lying in a horizontal plane. The height of each vertical, or deflectable contact rod 70L, 70T (FIG. 13) is such that the far free end 76L, 76T of its lower contact span 78L, 78T can deflect horizontally. Each lower, or distal, contact portion 78L, 78T lies between two vertical abutment surfaces 80L, 80T (FIG. 8A) and 82L, 82T. The abutment surfaces lie on lugs, or blocks of material 81L, 81T (FIG. 12) and 83L, 83T that are integrally molded with the bottom wall 72 and that project vertically upward.

Each control rod 70L, 70T (FIG. 8A) is capable of tilting from its vertical position. Such control rod tilt causes displacement of the lower, or far, contact span 78L, 78T towards a selected one of the abutment faces 80L–82L, 80T–82T.

Figure 12:
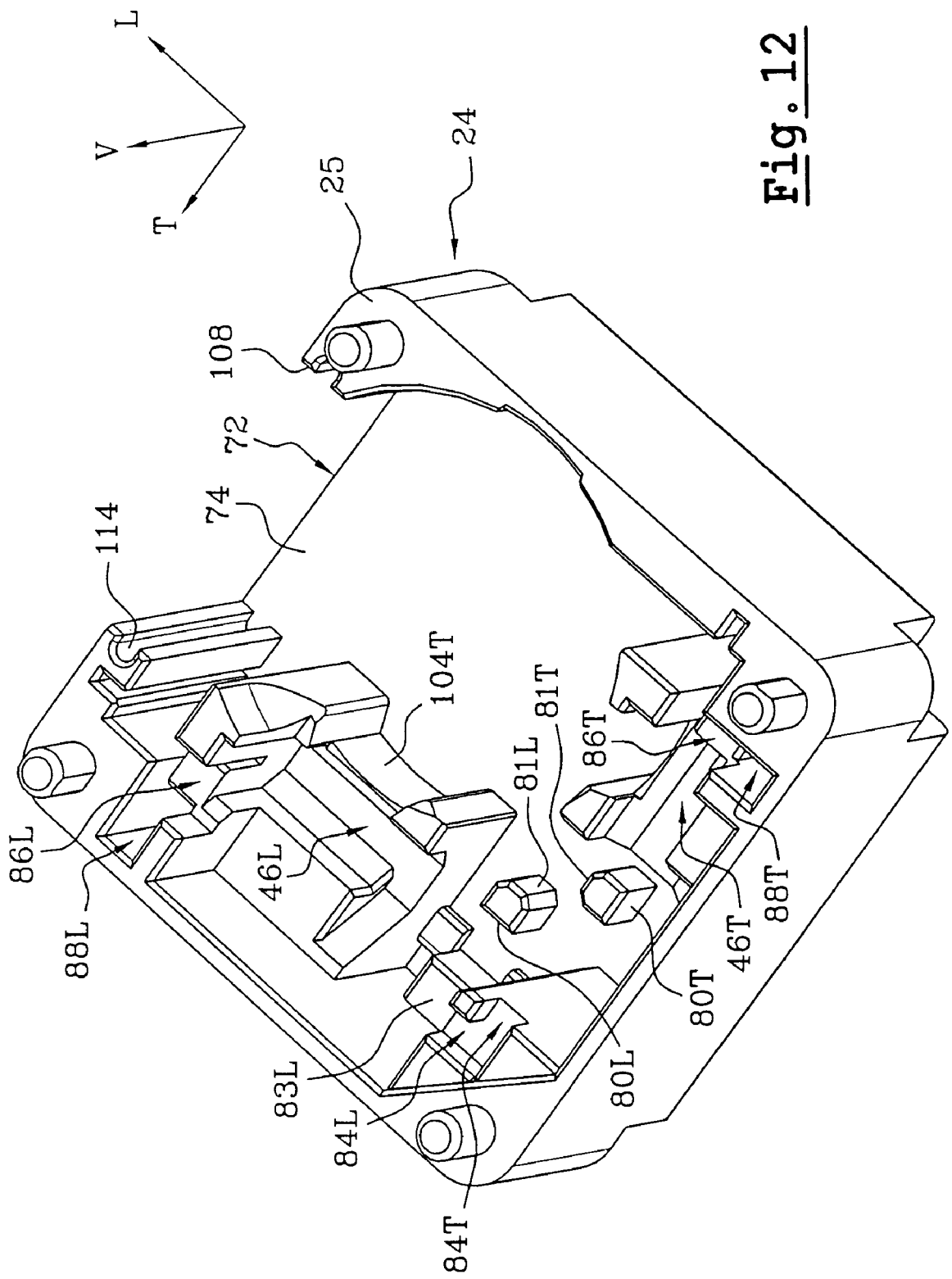
FIG. 12 is a view taken along the arrow F12 of FIG. 10.
Figure 20:
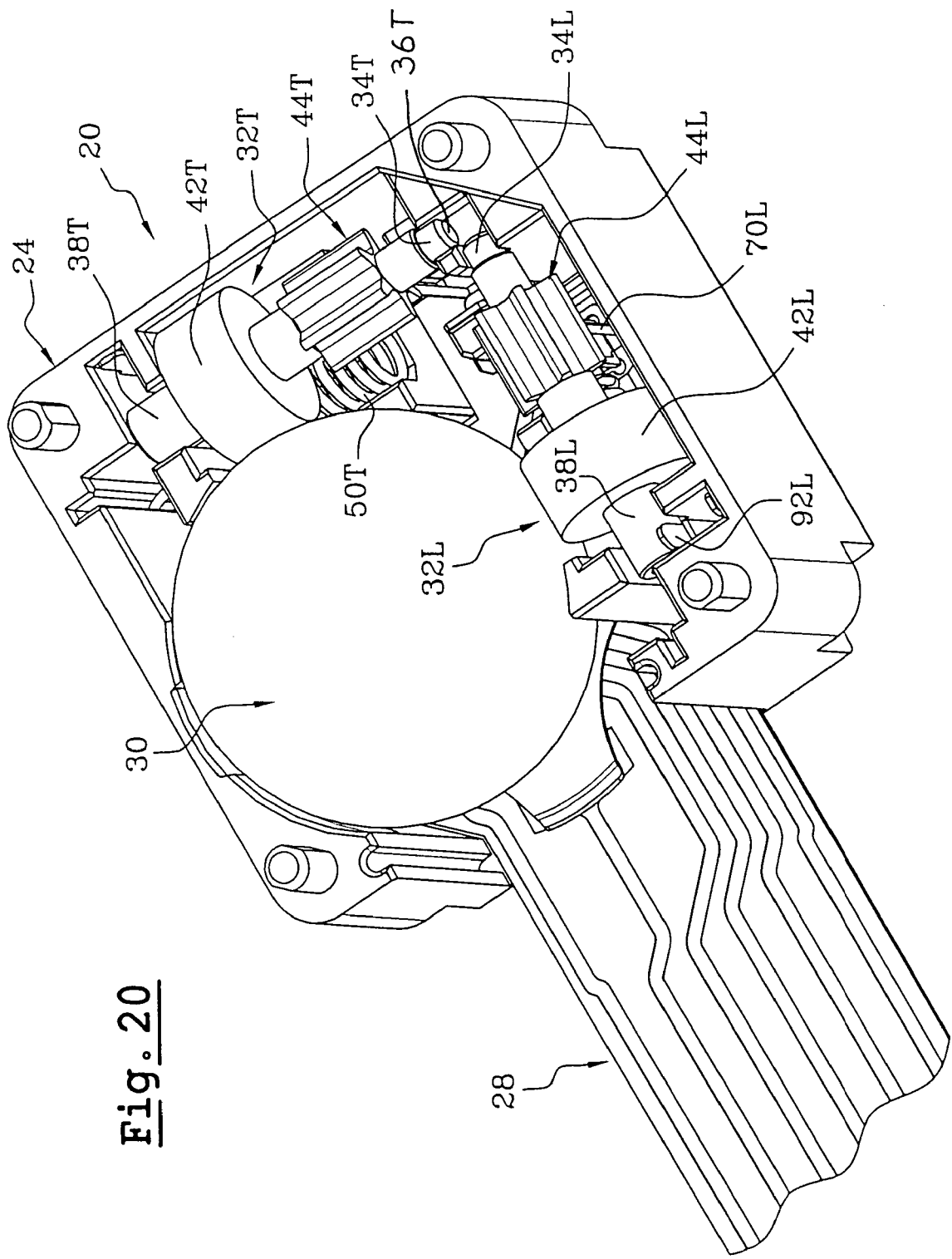
FIG. 20 is a view similar to those of FIGS. 18 and 19 with all the components in place and before closure of the housing by the upper cover.

The lower part 24 of the housing 22 forms upwardly-opening recesses 84L, 84T and 86L, 86T (FIG. 12). The recesses receive the free ends 36L, 36T and 38L, 38T (FIG. 20) of the coding shafts 32L, 32T. The horizontal width of the recesses 84L, 84T (FIG. 12) is substantially equal to the diameter of the end pivots 36L, 36T. Recesses 86L, 86T that are open towards the inside of the housing, each holds a biasing element 90L, 90T (FIG. 2), or elastic pin in the shape of a hairpin with about a 180° loop 91. Each biasing element lies in a recess 88L, 88T (FIG. 12) with a free end upper branch 92L, 92T (FIG. 20) of the element urging the corresponding coding shaft towards the ball 30 to push the corresponding roller 32L, 32T against the ball 30.

Figure 4:
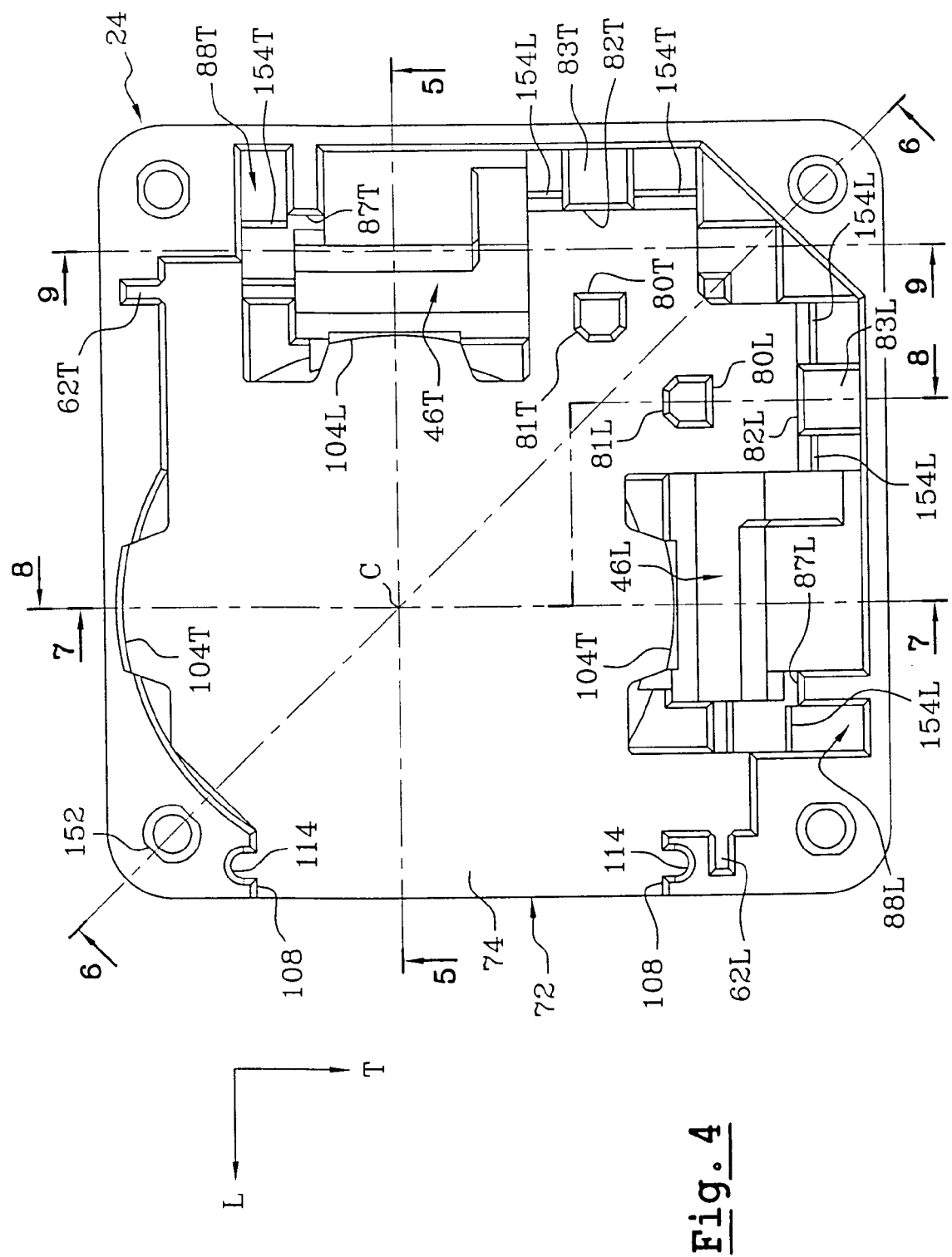
FIG. 4 is a plan view on a large scale of the lower part of the housing of the device of FIGS. 1 to 3.
Figure 15:
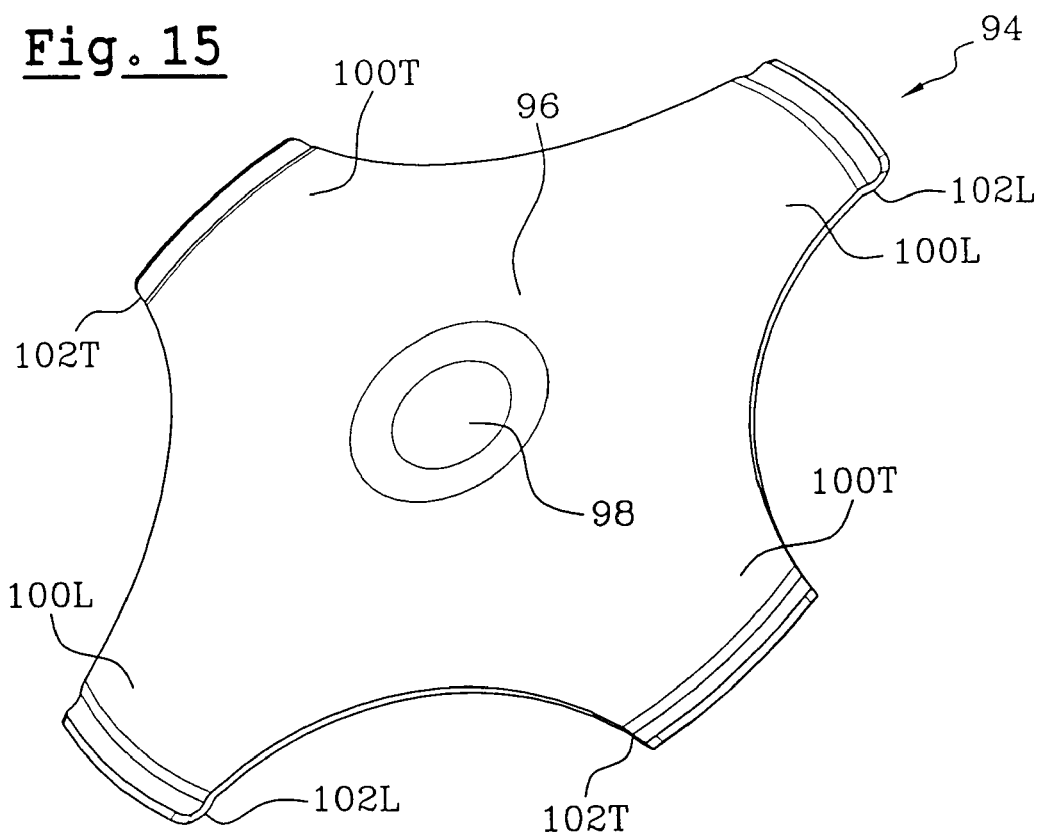
FIG. 15 is an isometric view of the triggering member of the entry switch.

In accordance with another aspect of the invention, the trackball control device includes an entry switch that closes when the ball is pushed down. The switch includes a resilient dome triggering member of the monostable type 94 (FIG. 15) of known general design in the shape of a star with four branches. The triggering, dome shaped, member 94 comprises a central part 96 forming a dish in the shape of a spherical cap 98 with its concavity oriented upwards, on which the trackball 30 bears. The dome member comprises two pairs of radial branches 100L, 100T angled 90° apart. Each branch terminates in a lower contact edge in the form of an arc of a circle 102L, 102T. The angular positioning of the triggering member 94 (FIG. 8C) in the lower part 24 of the housing is ensured by means of a pair of opposite recesses in the housing parts. These include recesses 104T in the lower part and two recesses 104L, one each in the lower and upper parts 24, 26 (FIGS. 4 and 12).

Figure 10:
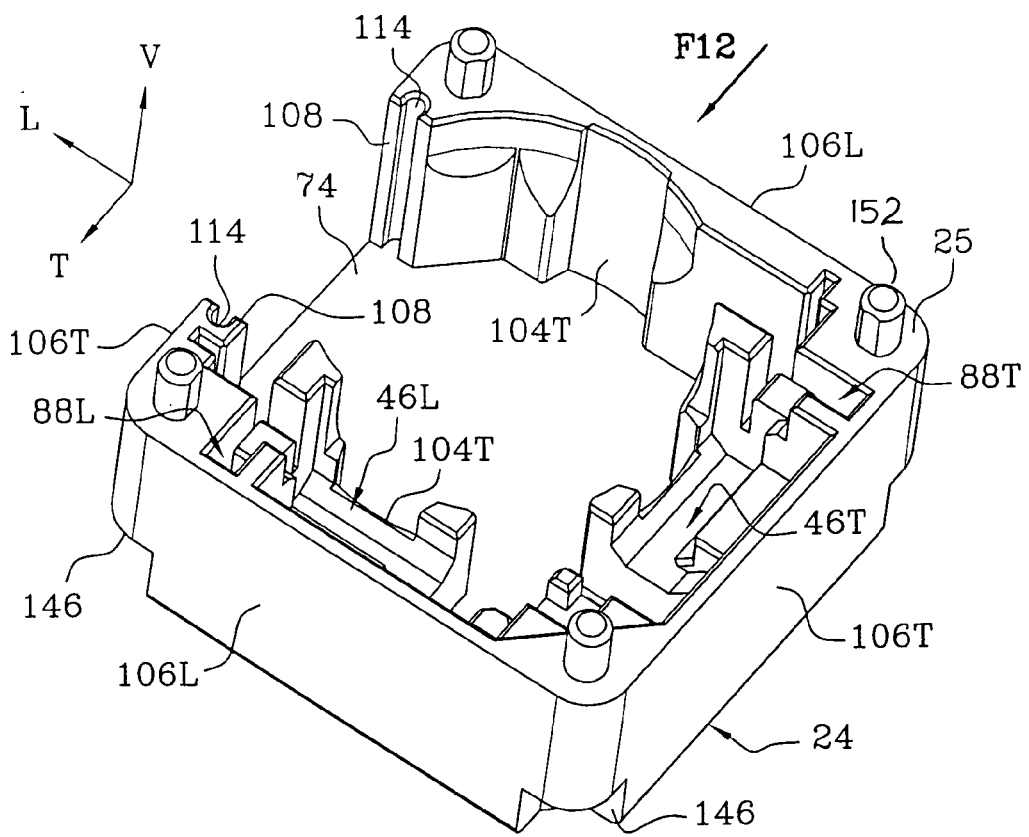
FIG. 10 is a top isometric view of the lower part of the housing.

As may be seen in FIG. 10, the lower part 24 of the housing 22 has transversely T spaced end walls 106T. One of the end walls forms an opening 108. The cover 26 illustrated in FIG. 11 includes a horizontal wall with a lower face 27 designed to bear on the upper face 25 of the lower housing part 24.

Figure 19:
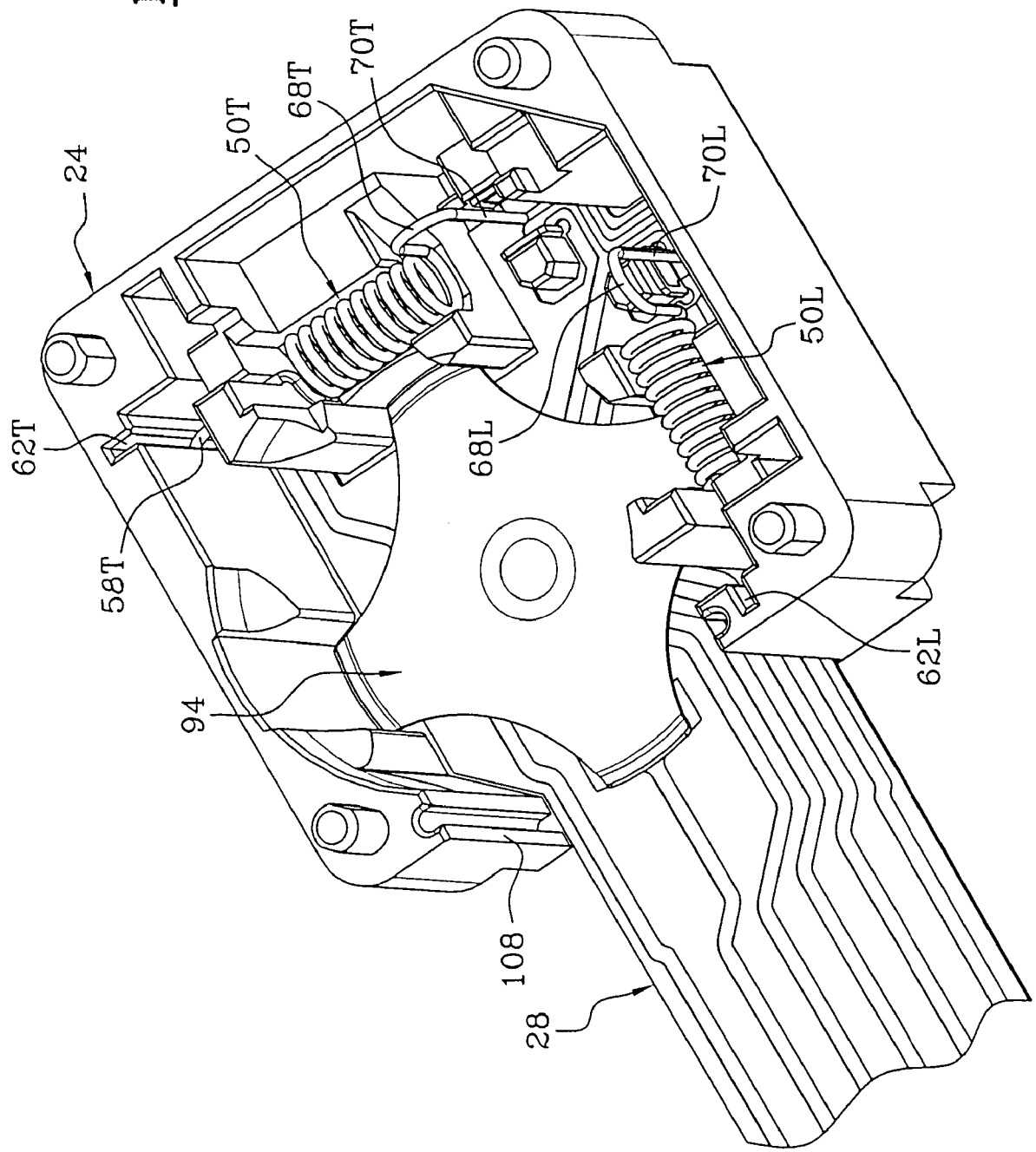
FIG. 19 is a view similar to that of FIG. 18 after the placement of the contact springs and rods, and of the triggering member of the entry switch.

The cover lower face 27 comprises cylindrical arc-shaped indentations to allow free passage and rotation of the rollers 42L, 42T (FIG. 20) and of the pinions 44L, 44T. The cover lower face has two vertically downward-projecting fingers 116L and 116T (FIG. 11) which hold the spring strands 58L and 58T in place in their associated slots 62L, 62T (FIG. 19). The fingers also bear downward against the flat flex cable.

The cover 26 (FIG. 11) has a vertical partition 110 that fits into the opening 108 of the lower housing part 24. The cover has two vertical ribs 112 that fit into grooves 114 formed in the edges of the opening. The ribs allow the cover to be mounted by sliding it downwards on the lower housing part 24. In the assembled position, and as will be seen for example in FIG. 1, the cover 26 fully closes the housing 22.

Figure 5:
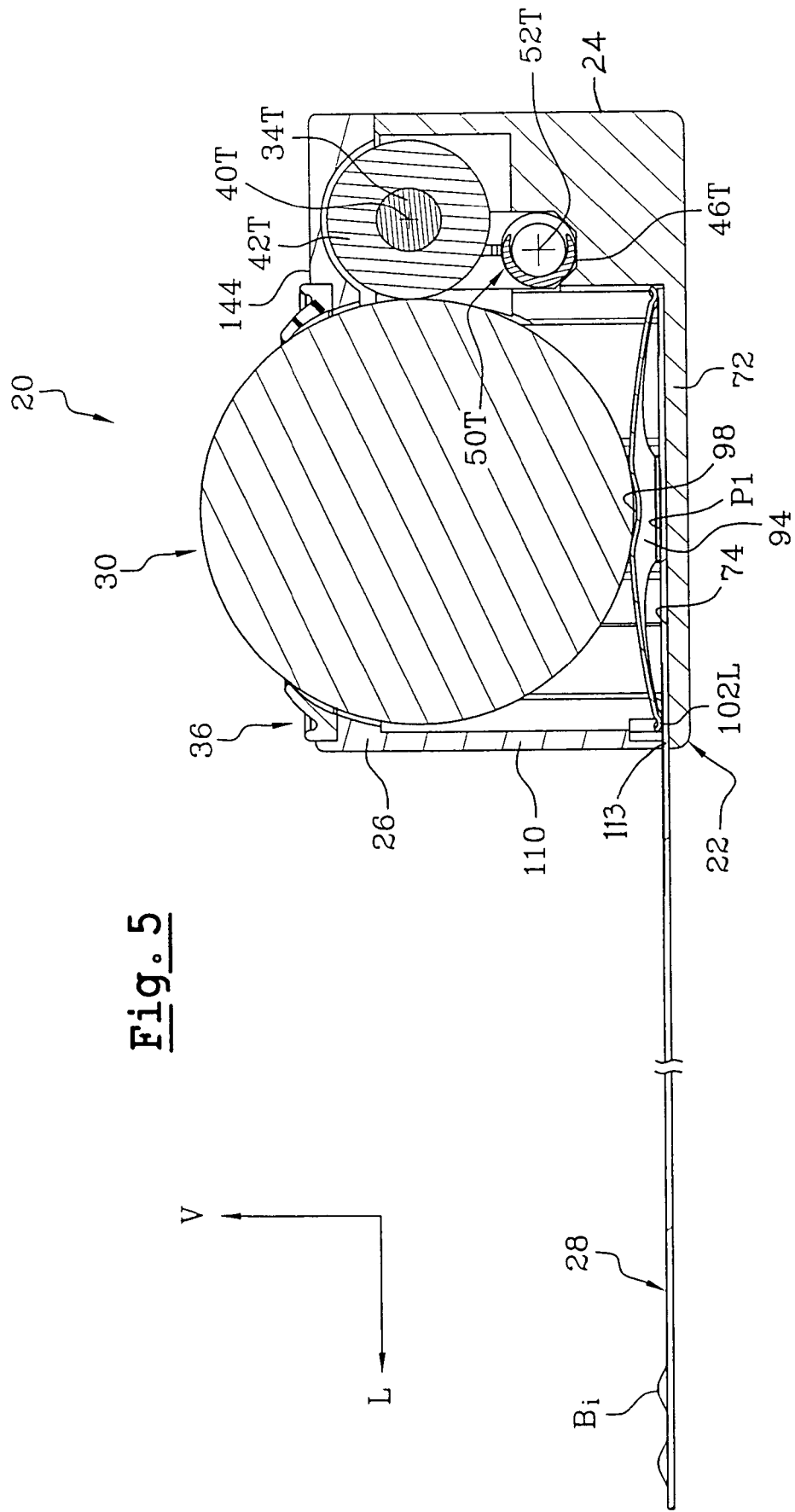

The height of the partition 110 is slightly less than the height of the opening 108 to allow the passage of the body 29 of the flat flex cable 28. The flat flex cable passes through a housing slit 113 (FIG. 5).

Figure 17:
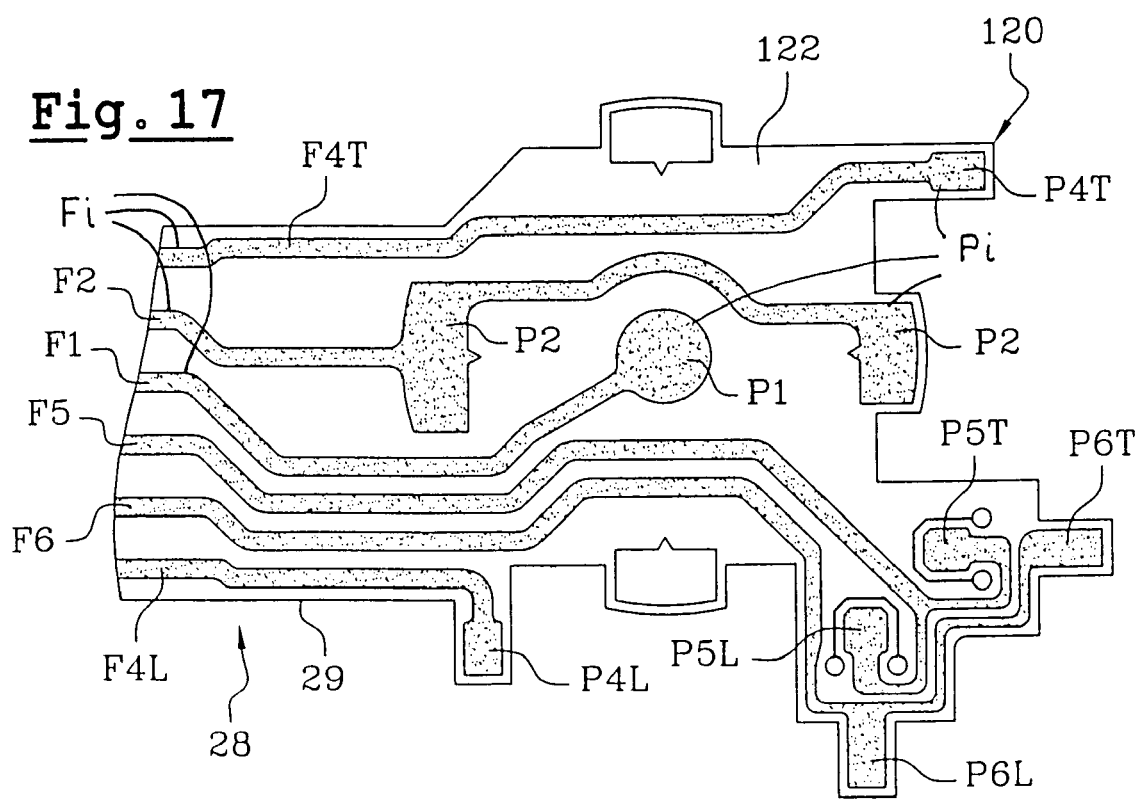
FIG. 17 is a plan view of the end span of the flat flex cable which is received in the bottom of the housing.

In all the figures, the upper face of the flex cable is drawn without the insulating upper layer, so as to show the lugs, or contact pads Pi (FIG. 17), and the terminals Bi (FIG. 1). The flex cable 28 comprises a body in the shape of a band 29 of small thickness, of the order of 0.12 mm, with conducting wires or lines inside. Each of the wires Fi terminates in a linking terminal Bi which is formed on the upper face of the band 29 in the shape of an arched dome which exhibits an elastic deformation capability for its linking by contact pressure with a conducting track of a printed circuit board.

According to an advantageous characteristic of the invention, a rear free end span 120 (FIG. 17) of the flat flex cable lies in the housing and has a series of exposed conducting pads Pi joined to the wires Fi, and forming fixed contact pads. The contact pads engage contacts of various active elements 70L, 70T, 60L, 60T and 94, 98 and 102L.

Figure 18:
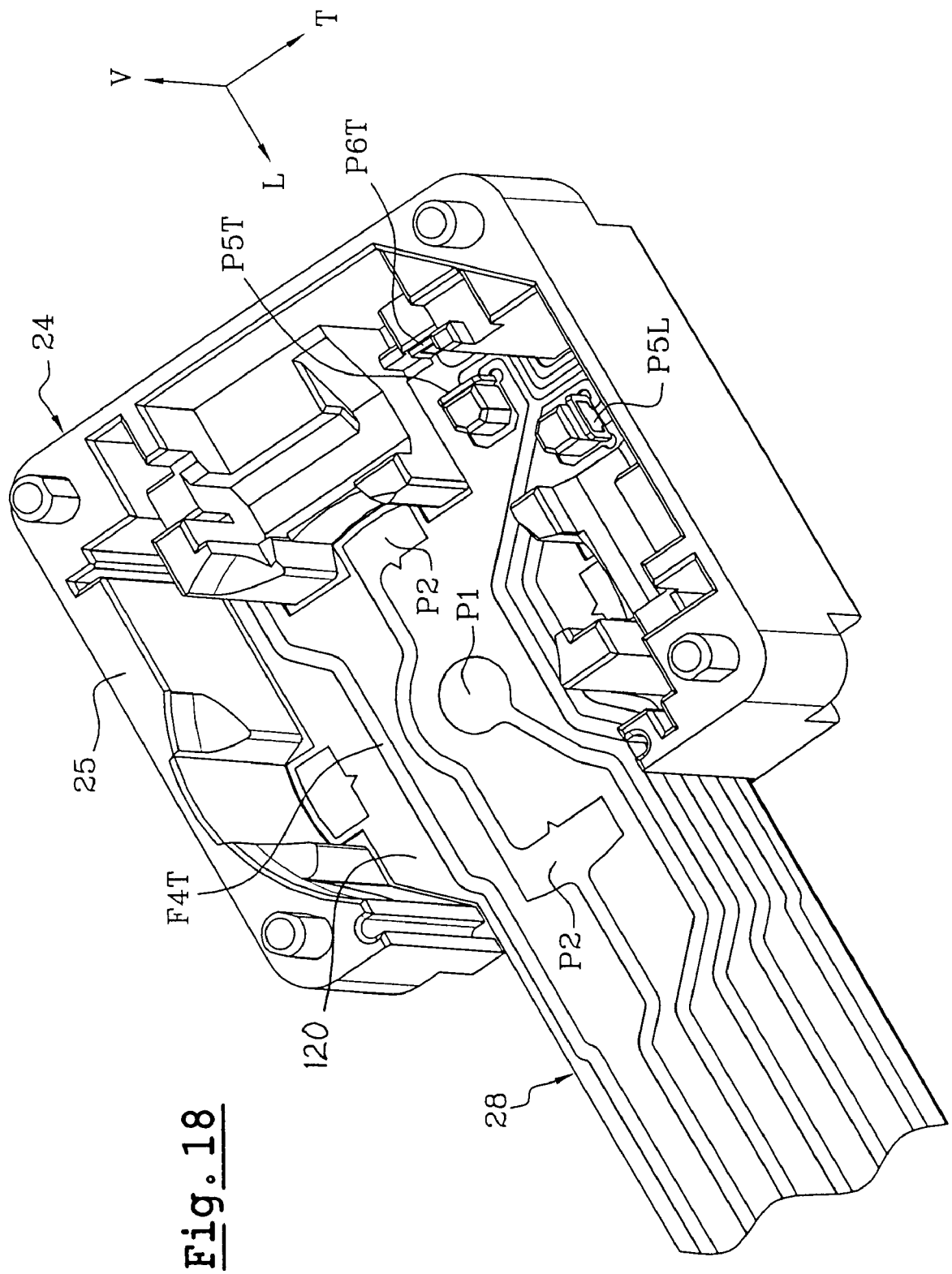
FIG. 18 is a view similar to that of FIG. 10 which illustrates the placement of the linking flat flex cable in the lower part of the housing.

The contour of the flex cable in-house portion, or rear span 120 with a cutaway profile allows its placement inside the lower part 24 (FIG. 18) of the housing and against the upper face 74 (FIG. 6) of the bottom wall 72.

To make the entry switch, in association with the triggering member 94, the upper face 122 (FIG. 17) of the flex cable rear span 120 comprises a central contact pad P1. The pad P1 is joined to a wire and lies directly under the central part of the dome trigger., Two pads P2 are joined together and to a wire F2, and lie on either side of the central pad P1. The lower edge 102L of the triggering member lies on the pads. Contact pads are also provided for the transmission of the coding signals produced by the signal generators associates with the contact shafts 32L and 32T.

The body of each spring 50L, 50T is joined to a wire F4L, F4T (FIG. 17) by way of a pad P4L, P4T. The free end 60L, 60T (FIG. 13) of the corresponding bent arm 58L, 58T bears against a pad P4L, P4T. Thus, each spring moveable contact rod 70L, 70T is joined, via the body 48L, 48T of the spring 50L, 50T, to a flex cable contact pad P4L, P4T, and hence to a corresponding wire F4L, F4T.

The lower contact span 78L, 78T of each spring moveable contact rod 70L, 70T is received between two opposite contact pads P5L, P5T (FIG. 18) and P6L, P6T of vertical orientation. The pads such as P5T, P6T are made by cutting the span 120 of the flex cable 28 and, after mounting, bending the pads to extend upright in vertical planes while bearing against the vertical surfaces of corresponding abutments 80L, 80T (FIG. 12) and 82L, 82T.

By placing the rear span of the flex cable 28 (FIG. 7) in the lower part of the housing, the various fixed contacts that include the pads P1, P2, etc. (FIG. 18) are positioned in the housing while the part of the flex circuit which exits the housing via the opening 108 (FIG. 19) is pressed down by the lower edge 111 (FIG. 11) of the partition 110. This way of fixing the span 120 of the flex cable 28 inside the housing is especially advantageous and economical.

Soldering operation is not necessary to connect rigid tabs projecting from the housing, with conducting tracks of a printed circuit board or with conductors of a flex cable disposed under the trackball device 20. This approach can avoid the need to solder, and facilitates recycling because components may be dismantled without unsoldering them.

Figure 21:
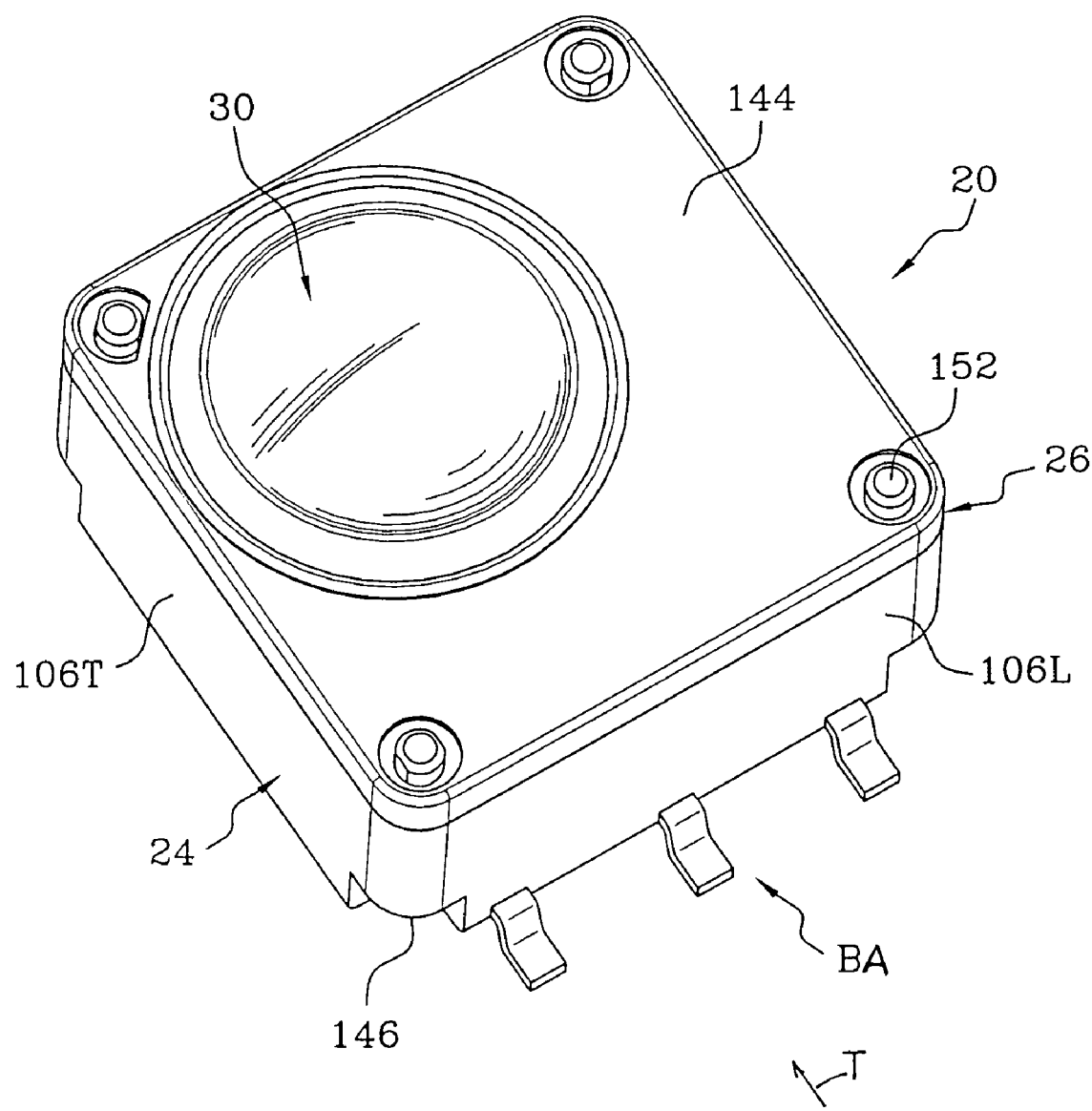
FIG. 21 is an isometric view similar to that of FIG. 1 which illustrates a variant embodiment of the invention in which the linking flat flex cable is replaced by connection tabs around which the lower part of the housing is overmolded.
Figure 22:
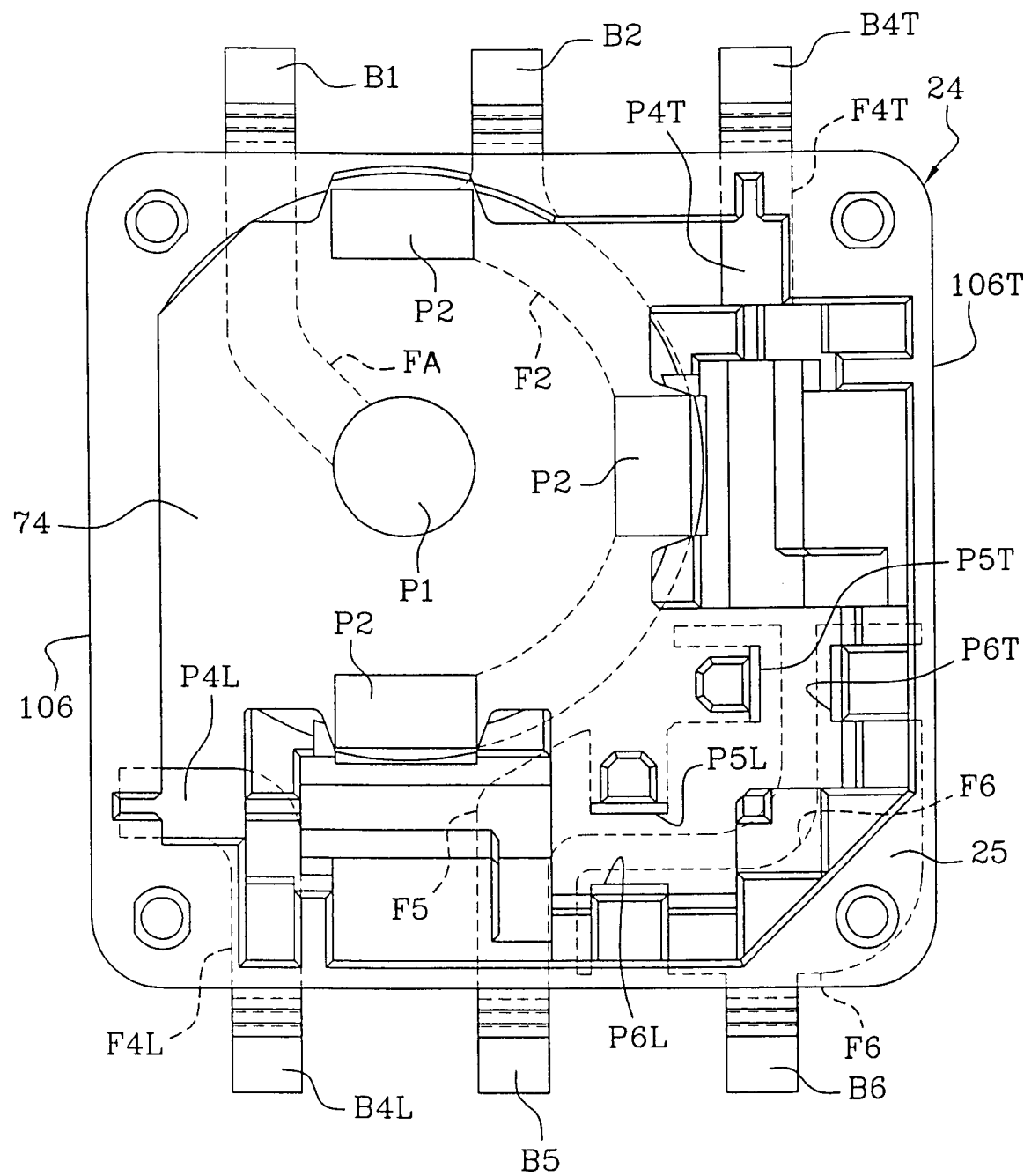
FIG. 22 is a view similar to that of FIG. 4 which illustrates the lower part of the housing of the control device of FIG. 21.
Figure 23:
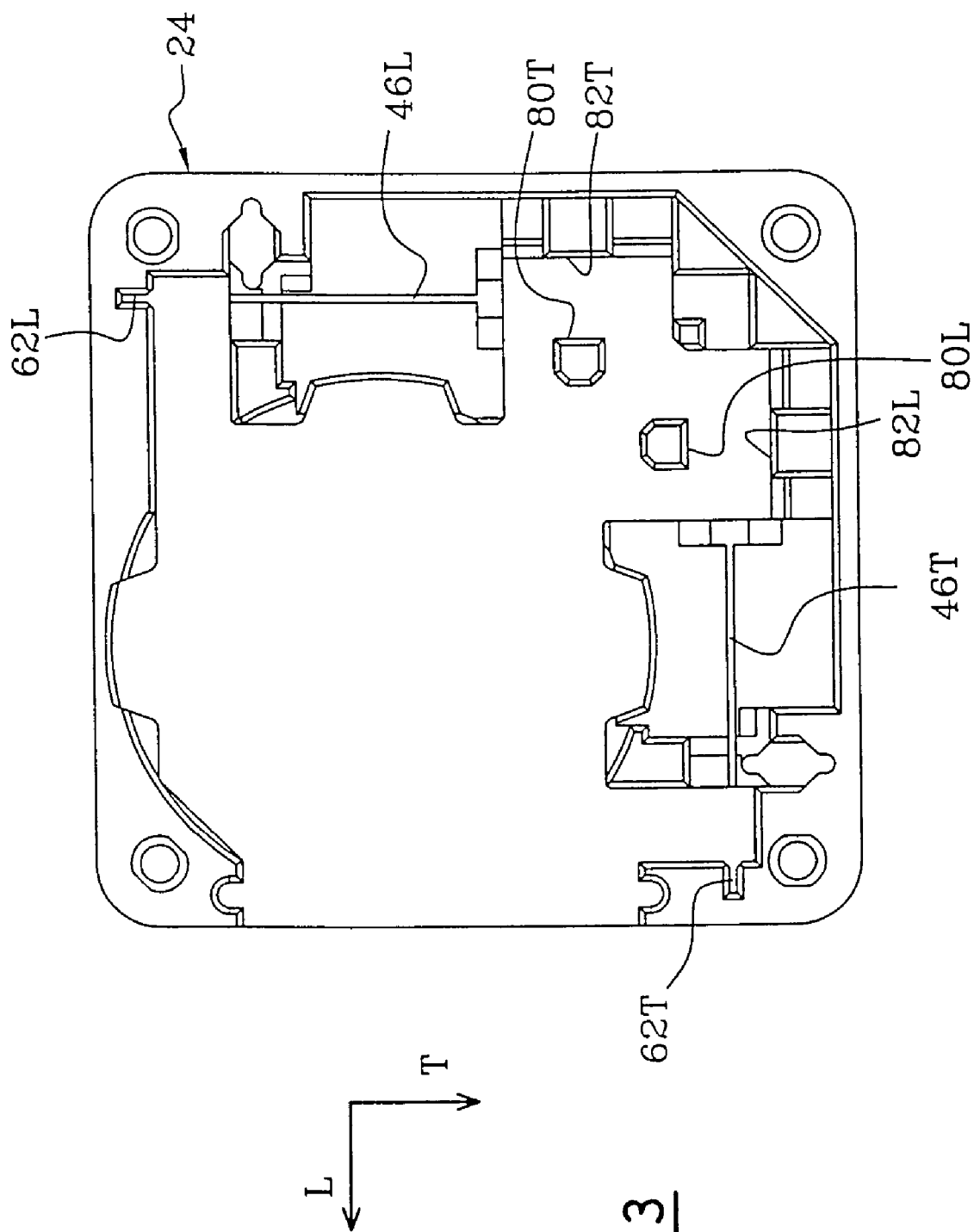
FIG. 23 is a view similar to the one of FIG. 4 of a variant of the lower part of the housing for receiving the variant of the contact spring and rod illustrated in FIG. 25.
Figure 24:
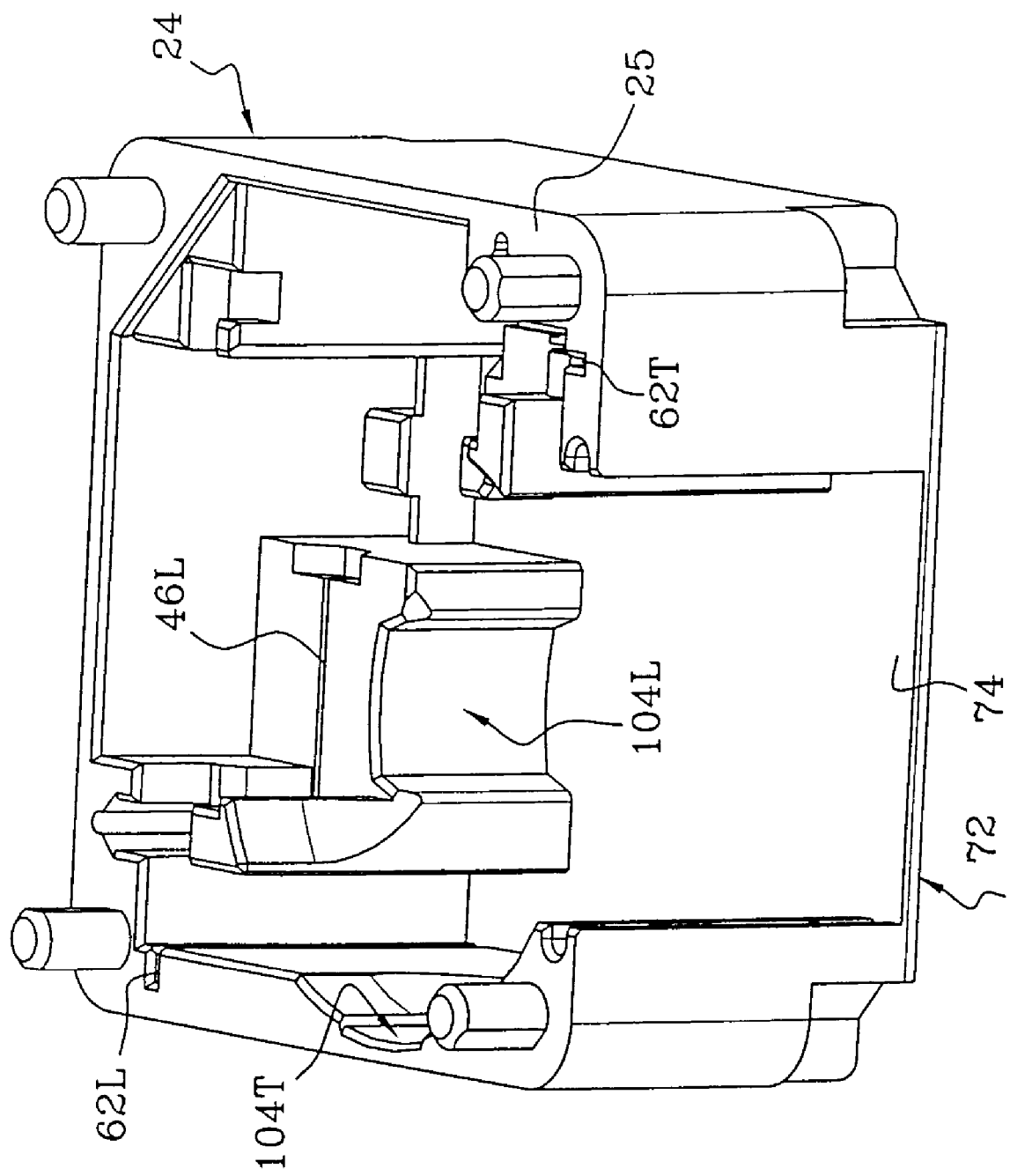
FIG. 24 is an isometric view similar to the one of FIG. 12 of the variant of the housing of FIG. 23.

This may be compared to placing the flex cable below the trackball device and being soldered thereat, as shown by the embodiment of FIGS. 21 and 22.

Owing to the absence of reflow soldering, the housing and other parts can be molded of a plastic that can withstand only moderate temperatures and which is of lower cost. The incorporation of the flex cable with the device 20 makes the flex cable a component with fixed contact pads lying in a common plane (except where bent up) to enable a flat housing bottom 72, 74 to support the flex cable.

The manner of operation of the signal generators will now be described with particular reference to FIGS. 8A to 8C. This description will be given with reference to one coding shaft 32L. In the rest position of FIG. 8A, the moveable, or mobile contact rod 70L is vertical. Its bent upper span or proximal end 68L is received with transverse play between the opposing flanks 45L of two consecutive teeth of the coding pinion 44L.

Figure 8B:
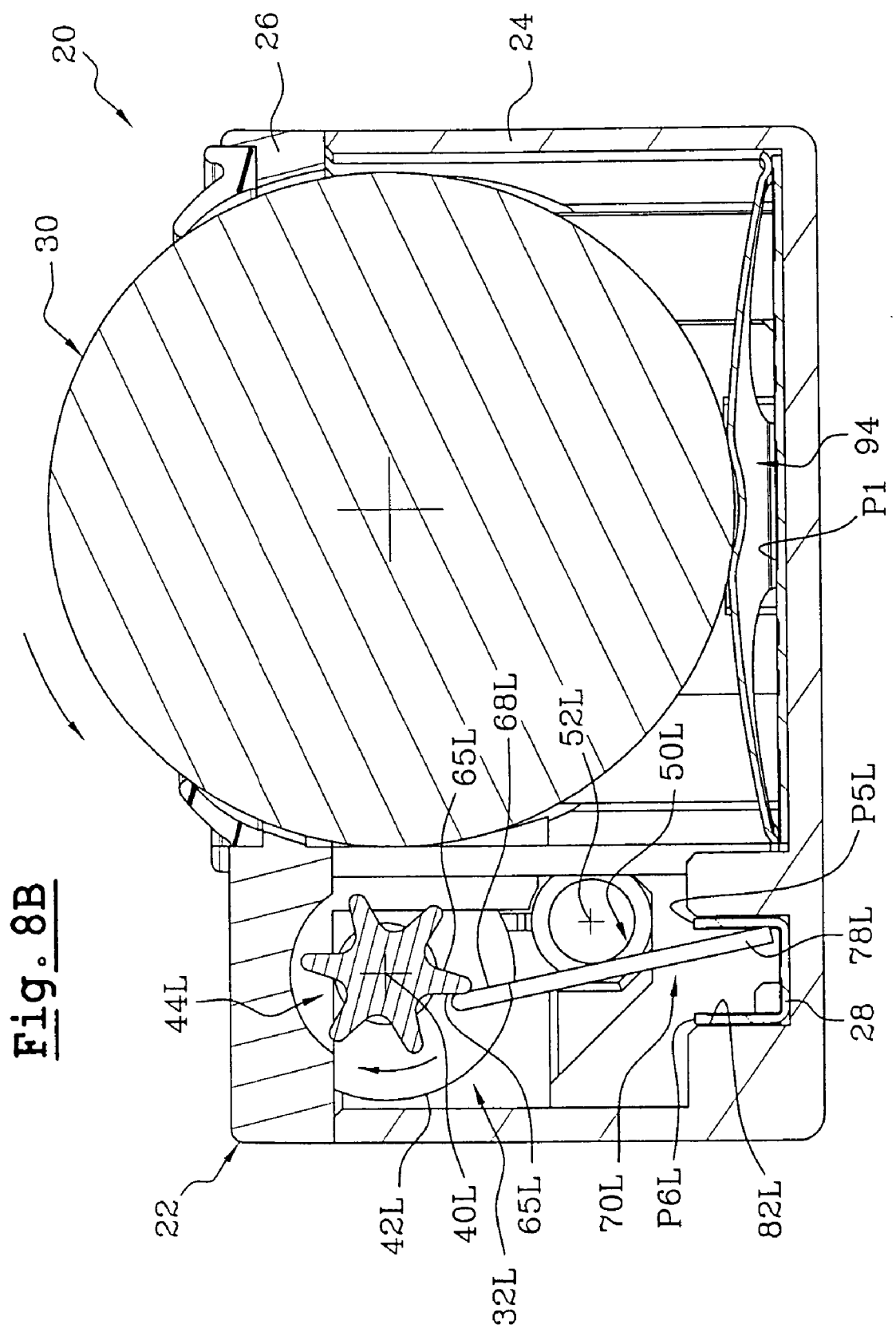
FIGS. 8B and 8C are views similar to that of FIG. 8A and in which the contact rod is shown in two opposite contact positions.
Figure 8C:
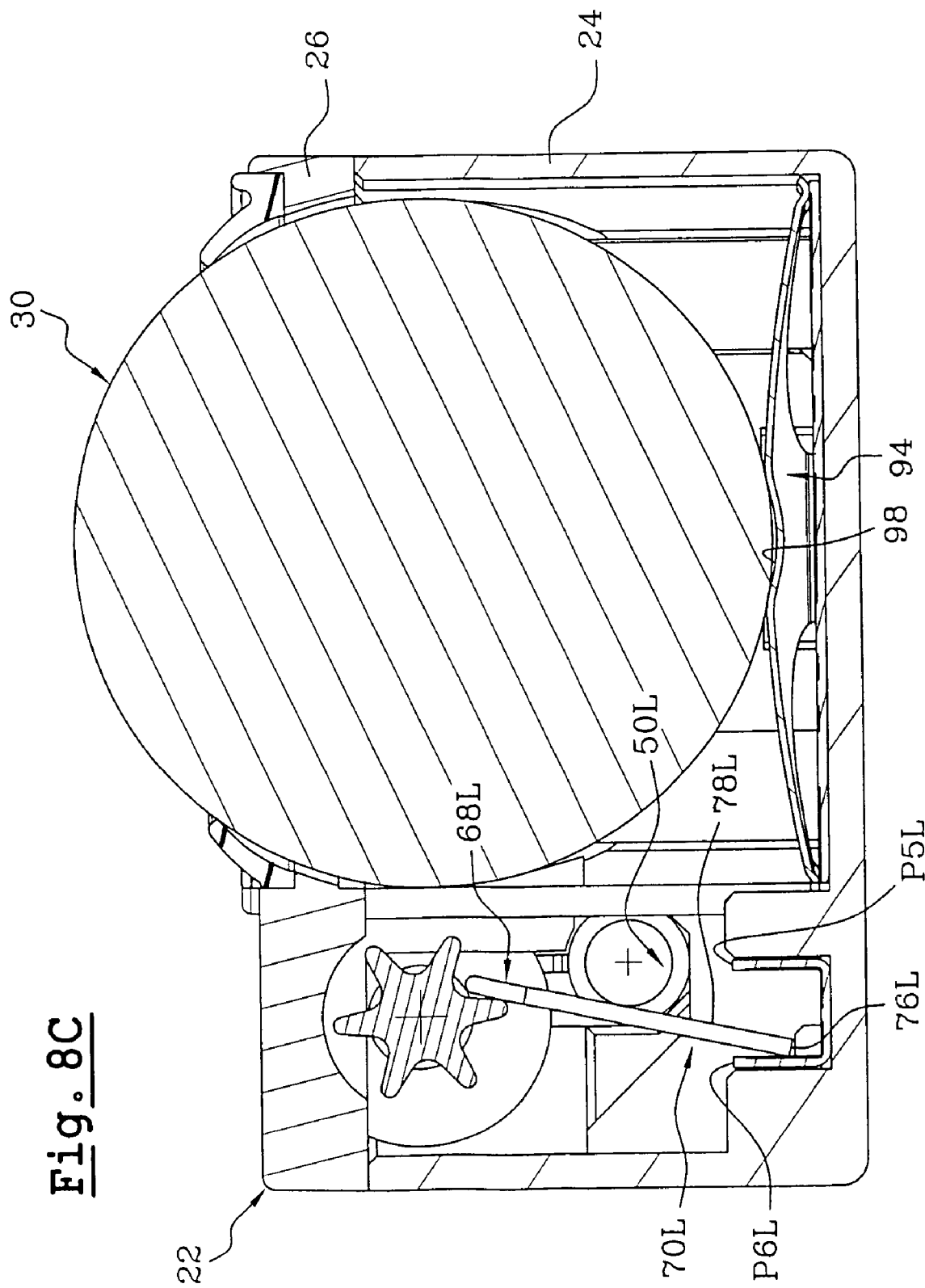
Figure 9:
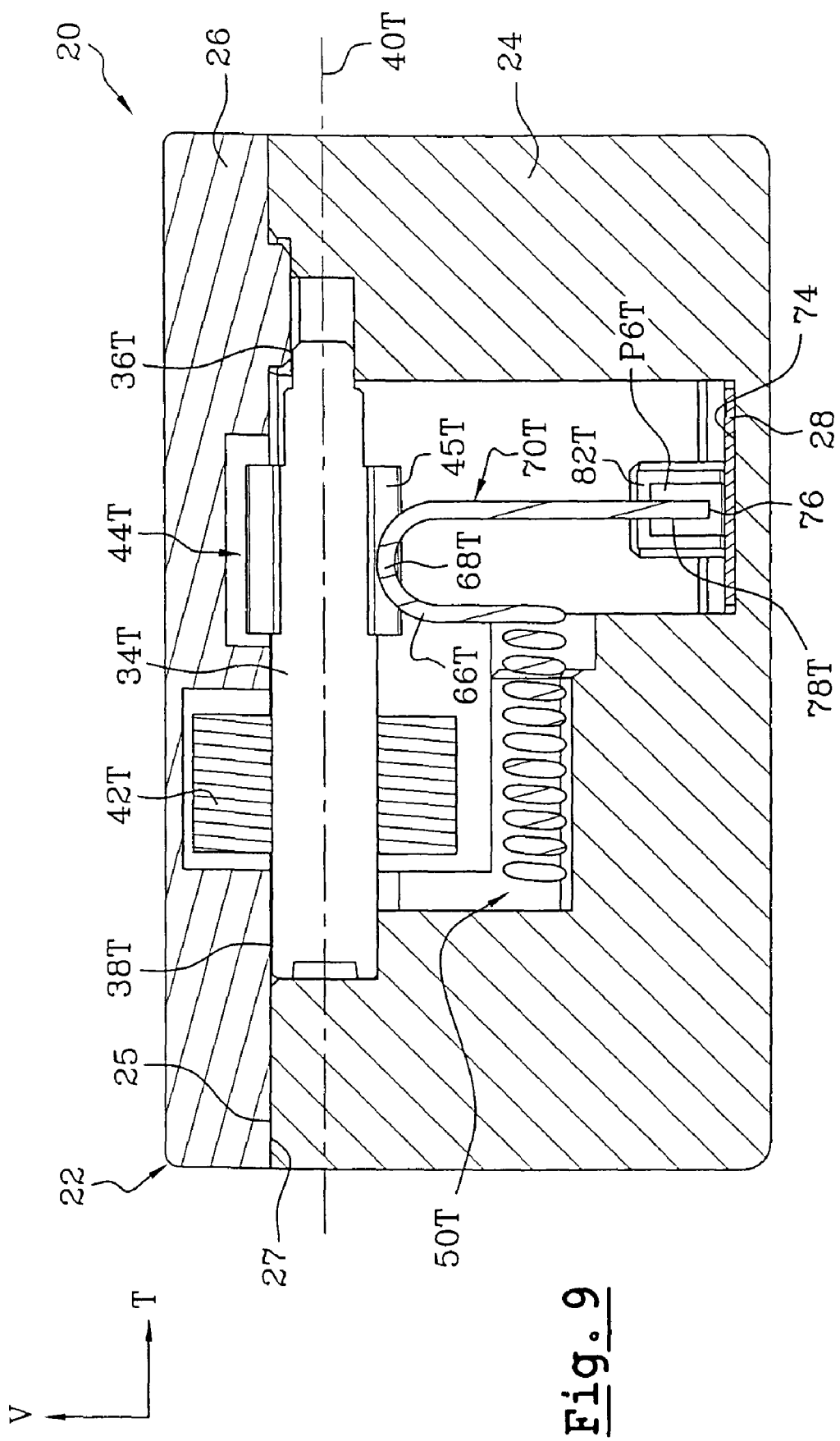

First, assume a slight counterclockwise rotation of the ball 30 about a horizontal axis that passes through the center C, as indicated by the arrow of FIG. 8A. This causes clockwise rotation of the shaft 32L about its axis of rotation 40L. This rotation presses the flank 45L of the right-hand tooth to push the upper span 68L to the left. The rod 70L tilts about the axis 52L until its lower end 78L comes into electrical contact with lug P5L as shown in FIG. 8B. The rod presses the lug against the abutment surface 80L (FIG. 8A). This establishes an electrical link between the contact pads P4L (FIG. 17) and P5L through the spring.

Clockwise rotation of the roller 32L (FIG. 8A) continues and this rotation causes, in the manner of a mechanism of the "Maltese Cross" type, the automatic escapement of the upper span 68L. The upper span 68L automatically return to its stable vertical position illustrated in FIG. 8A.

If the rotational movement of the ball 30 is continued in the same direction, the rod 70L will again tilt to the orientation represented in FIG. 8B so as to cause the generation of a new signal by virtue of the electrical contact which is again established between the pads P5L and P4L.

Conversely, if the ball 30 is rotated in the, clockwise direction in FIG. 8A, the coding shaft 32L is driven in the counterclockwise direction. As shown in FIG. 8C the pinion tooth causes the tilting of the contact rod 70L until its lower contact span 78L, or distal end contacts pad P6L and presses it against the vertical surface 82L (FIG. 8A). This establishes an electrical contact between the pads P6L and P4L, generating a signal which is different from that resulting from the linking across the spring 50L of the pads P5L and P4L. This differentiation of the two types of signals makes it possible to distinguish the direction of rotation of the relevant coding shaft, and hence the direction of rotation of the ball, doing so by means of a single mobile contact, 70L or 70T, for each signal detector.

The design and dimensioning of the spring 50L with the contact rod 70L prevents the phenomena of rebound. After the span 68L passes a tooth and is again received between two teeth, the teeth avoid a rebound. The dimensioning of the elements, and in particular the pitch of the teeth of the pinion, prevents rebound against the pad opposite the one that was just contacted.

Depending on the type of manipulation applied to the ball 30 by the user, the user can cause the simultaneous rotation of both coding shafts 32L and 32T in one or other of their opposite directions of rotation. The ball practically always revolves about a horizontal axis, and the numbers of pulses generated by the two generators are respectively proportional to the X and Y components of the cursor on the screen.

Figure 2:
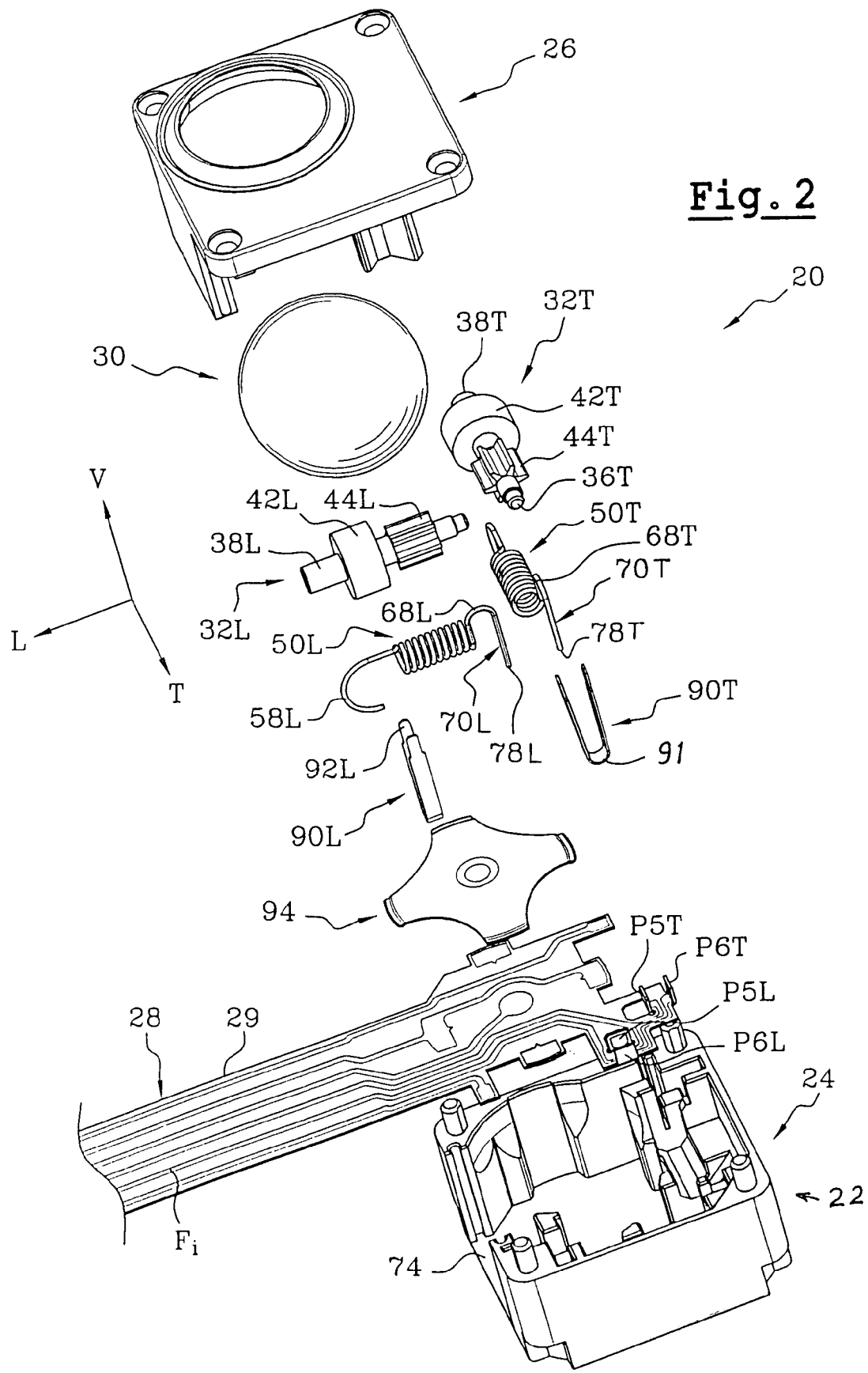
FIG. 2 is an exploded isometric view of the components of the device of FIG. 1.
Figure 3:
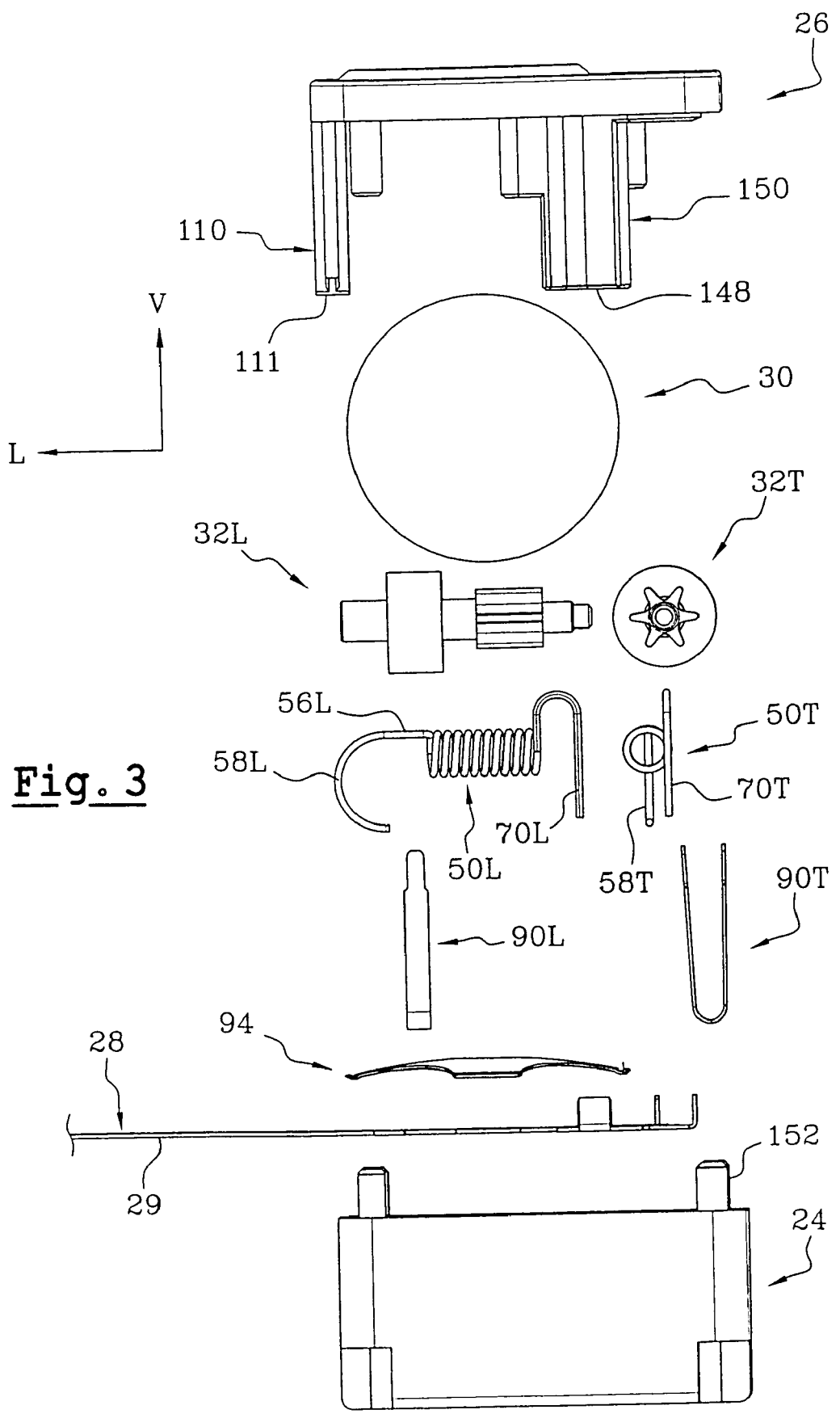
FIG. 3 is a sectional view of the components of FIG. 2.

The driving of the rollers 42L, 42T carried by the shafts 32L, 32T is ensured by friction with the outer surface of the trackball 30. The shafts and rollers are urged against the ball by resilient biasing elements in the form of hairpin springs 90L and 90T (FIG. 2). The biasing elements are formed of sheet metal for stability.

As shown in FIG. 8A, there is a vertical offset "h" of the center C of the ball 30 beneath the plane in which the axes 40L and 40T of the coding shafts 32L and 32T are situated. The ball is urged upward by the resilient dome 94 which is slightly deflected downward in its rest state illustrated in the figures, and in particular in FIG. 8A.

Figure 6:
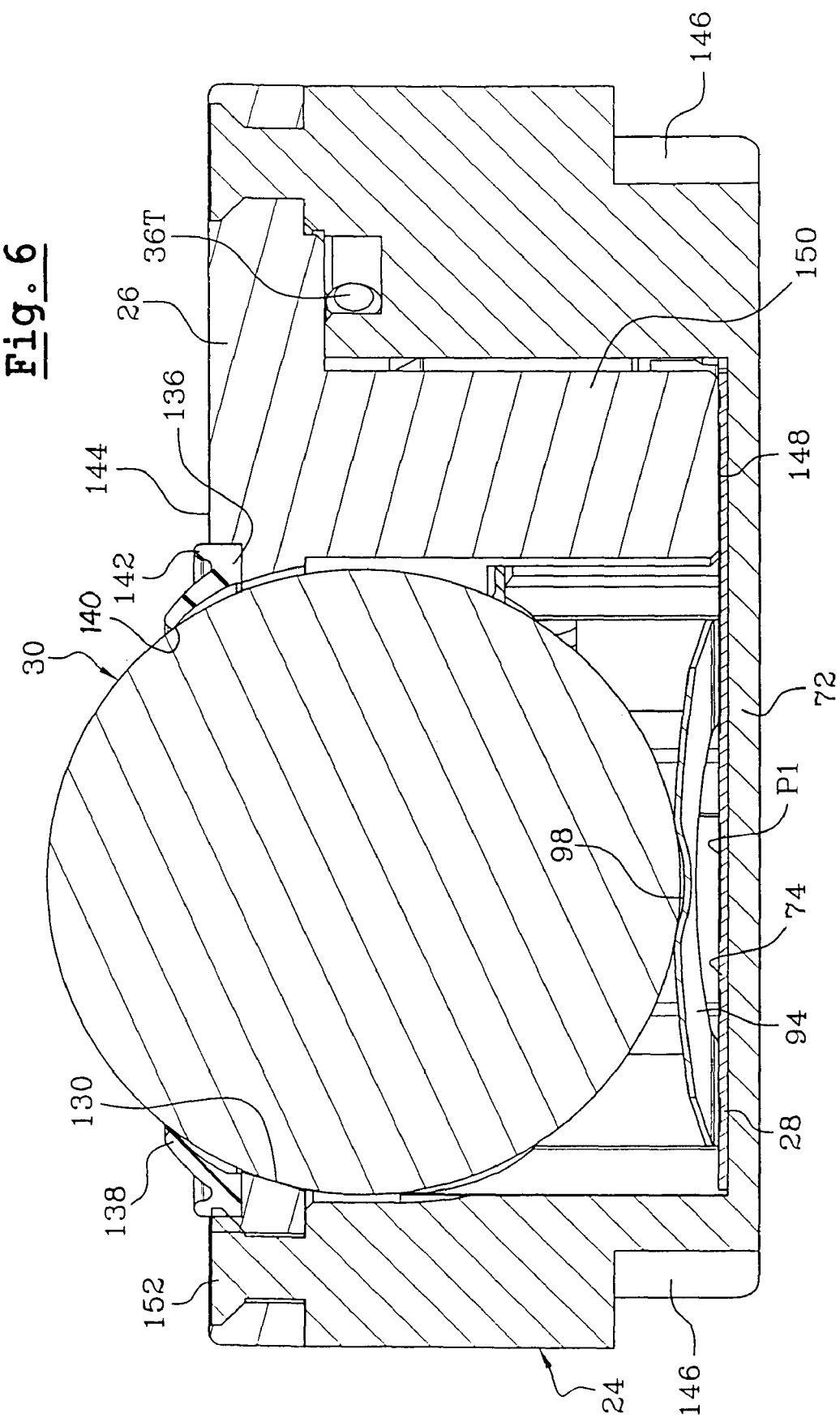
Figure 11:
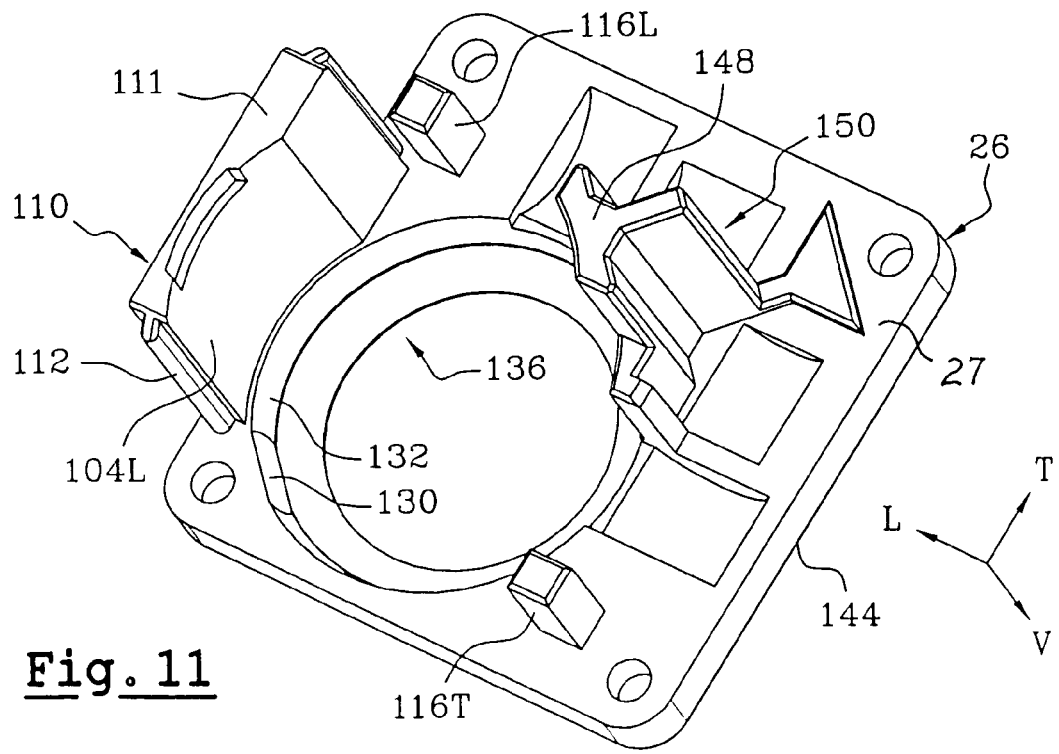
FIG. 11 is a bottom isometric view of the cover or upper part of the housing.

The ball not only contacts the rollers, 42L and 42T, but also bears against a third bearing surface consisting of a land 130 (FIGS. 6 and 11). The land limits the circular opening through which the apex of the ball 30 projects our of the housing 22. These four contact points (including the triggering dome), of which three are fixed and one is mobile, define the geometrical rest position of the ball 30 with respect to the housing 22.

When the ball 30 is turned it may apply a downward force on a roller of a coding shaft. The large-diameter pivot end 38L, 38T (FIG. 13) presses down against a vertical facet 87L, 87T (FIG. 4) of the housing. The corresponding biasing element, or hair spring 90L, 90T (FIG. 2) then has no function. In the opposite case, the load exerted by the operation tends to distance the ball 30 from the roller of the coding shaft, but the spring 90L, 90T guarantees maintained contact of the roller 42L, 42T with the ball 30, since the pivot 38L, 38T is not bearing against a vertical facet of the housing on the ball side.

The design of the signal generators according to the invention, if it is compared with the known electromagnetic or electro-optical coding devices, is especially advantageous in that, in the rest state of each generator, there is no consumption of current.

When a direct vertical load F is applied to the trackball 30, this closes a switch. Such action causes downward movement of the ball and causes downward movement of the monostable triggering member 94 until its central part 98 comes into contact with the conducting pad P1. This results in an electrical linking, or connection, between the pads P1 and P2 and hence between the wires F1 and F2, while affording the user a tactile sensation of actuation of the entry switch.

This entry switch action, caused by the ball 30 depressing the triggering member, occurs without displacement of a subassembly as in the prior art, and produces maximum tactile feedback. In the example illustrated in the figures, the total resilient deflection of the dome 94 is of the order of 0.4 mm, its triggering requiring that a virtual load of 3 newtons (0.4 pounds) be applied to it.

Figure 7:
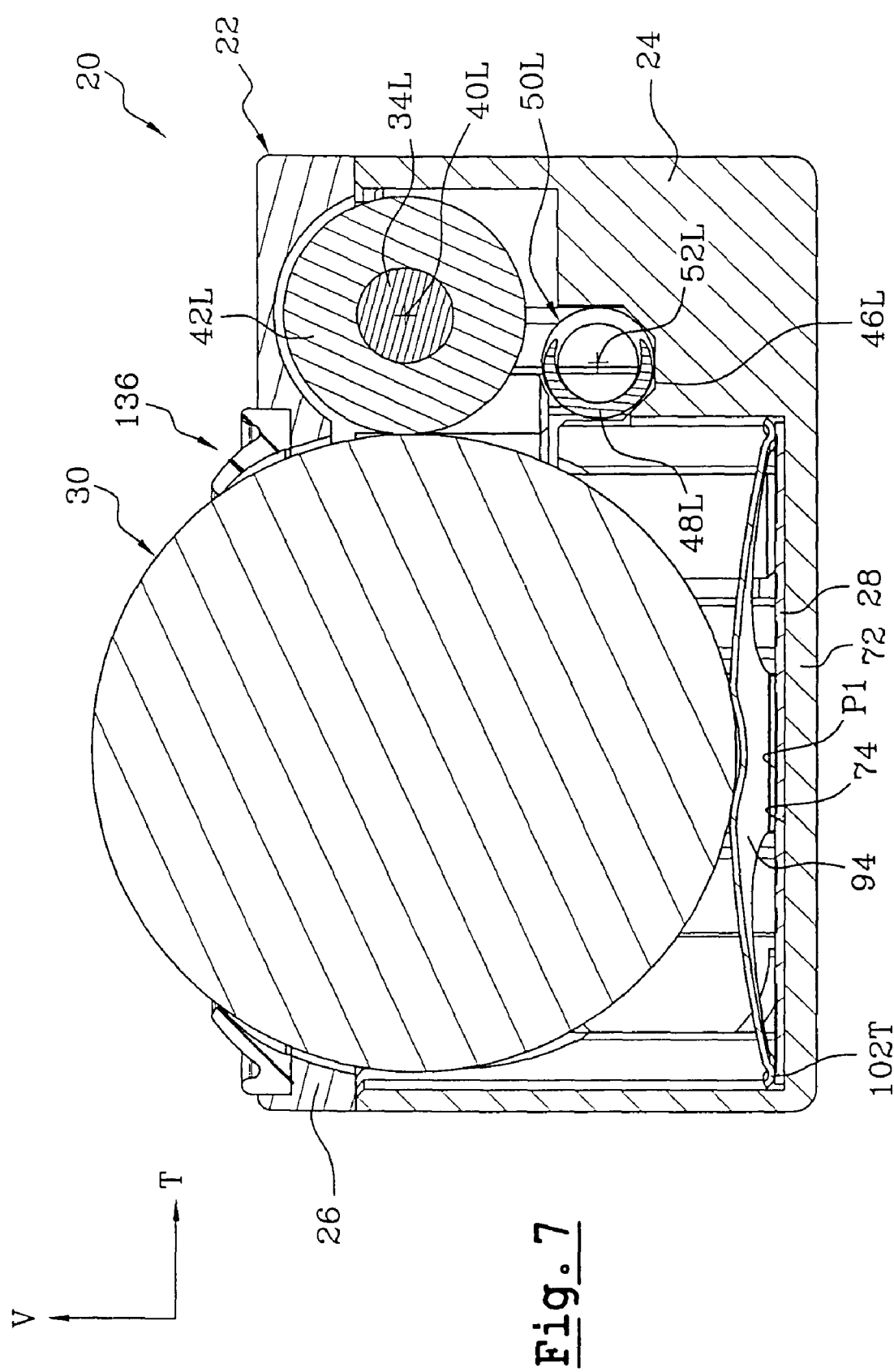

As shown in FIG. 7 a peripheral seal 136 with lip 138 (FIG. 6) is provided which is overmolded with the cover.

The flexibility of the lip 138 of the scraper seal 136 makes it possible to ensure the tightness of the device during the entry action since the free edge 140 of the lip 138 always remains in contact with the peripheral surface of the ball 30 which moves downwards by only 0.4 mm.

Owing to the positioning of the center C (FIG. 8A) of the ball 30 beneath the plane of the axes 40L and 40T on the order of 0.1 mm, the entry switch action tends to "detach" the ball 30 from the rollers 42L, 42T and it thus has no nuisance effect on the rollers 42L and 42T. That is, the action does not affect the generators of coded signals, which remain in their states corresponding to their angular positions attained at the moment of entry.

The roller 42L, 42T of each encoding element can be made by overmolding an elastomer around the body 34L, 34T. The choice of elastomer together with the surface condition and the Shore hardness makes it possible to increase the coefficient of friction with the ball 30 which is, at its periphery, made of hard plastic.

If one wishes to require a large downward force to be applied to the ball 30 to close the entry switch, it is possible to invert the choice of materials. This is done by molding the ball periphery of an elastomer. This has the effect of increasing the frictional loads of the ball 30 on the cover 26, 130, on the scraper seal 138, and especially on the entry dome 94. In this case, the tightness during entry can be ensured without any flexible lip or scraper seal (except during the entry switching).

The peripheral surface of the ball 30 and/or the lip 136 of the seal 136 can undergo a water-repellent or oil-repellent treatment which makes it possible to reduce the risks of leakage around the ball, into the device, and makes it possible to improve the effectiveness of cleaning of the ball by the scraper seal.

It will be noted that the dimensions of the control device are especially small and that it thus exhibits considerable compactness allowing easy integration thereof into a portable telephone.

The semi-toroid shape of the seal 136, which projects vertically upward with respect to the upper face 144 of the cover 26, assures that dust or other matter cannot enter the device.

By virtue of the design with the flex cable 28, the device 20 with its housing 22 can be fixed under the internal face of the upper shell of a telephone by elastic clasping between flexible fingers belonging to the shell and whose hook-shaped lower ends are received in complementary notches 146 (FIG. 6) of the housing 24.

The elasticity of the semi-toroid seal part 142 makes it possible to allow larger tolerances in manufacture and of elastic clasping. This mode of fixing replaces the mechanical fixing of the device 20 onto a printed circuit board and thus makes it possible to avoid having to correct defects of alignment of the ball 30 with the circular opening formed in the shell. That is, it allows accurate centering of the trackball 30 with respect to the shell. This fixing also allows easy maintenance of the electronic apparatus such as the telephone.

Various steps of assembling the components of the device 20 may be seen in succession in FIGS. 4 and 10, then 18, 19, 16 and finally 20, before the mounting of the cover 26.

Figure 16:
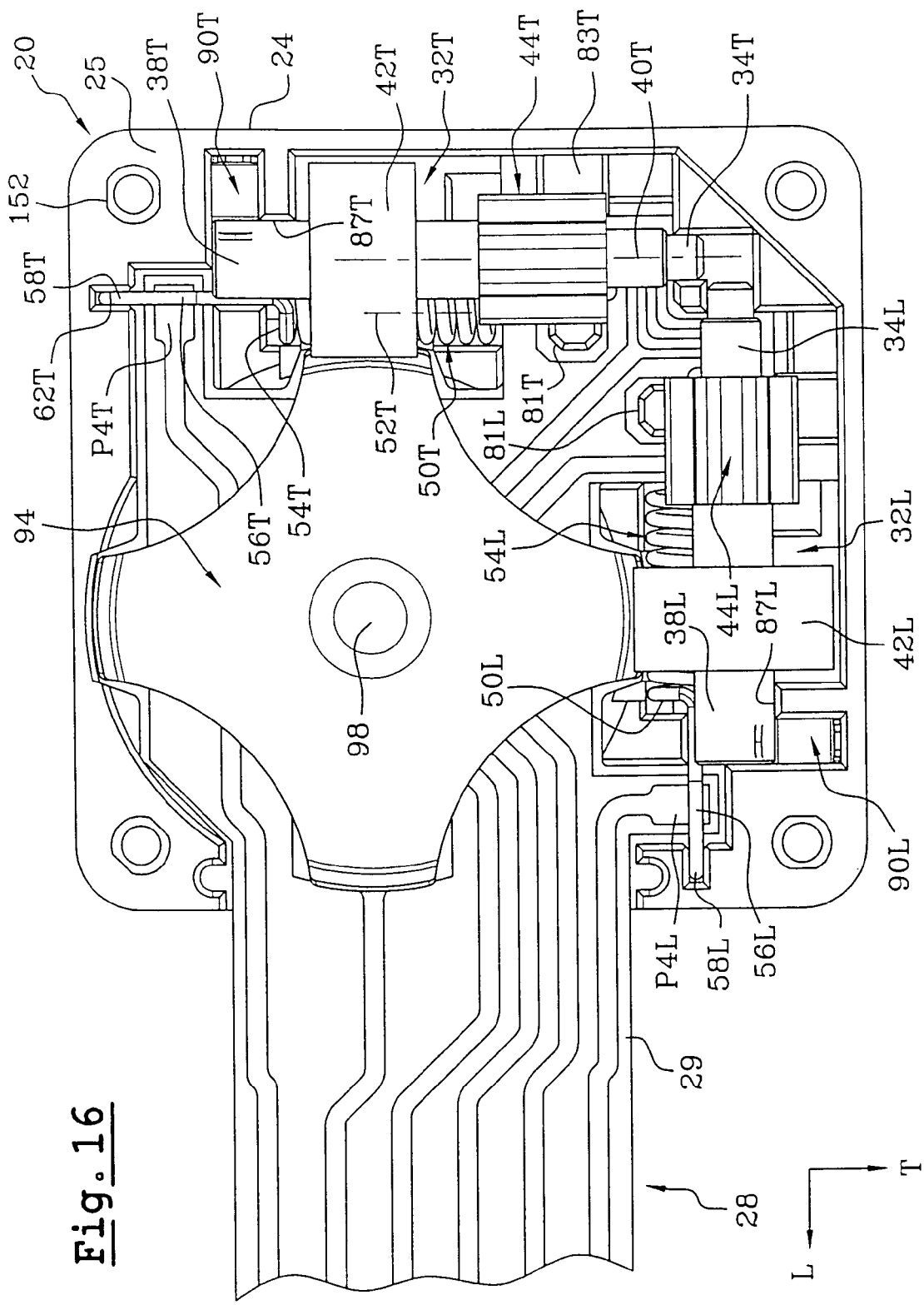
FIG. 16 is a plan view similar to that of FIG. 4 with the set of components mounted in the lower part of the housing, except for the trackball.

The positional holding of the flex cable span 120 (FIG. 18) of the flex cable 28 in the bottom of the lower part 24 of the housing 22 is ensured through the contact pressure of the four edges of the dome member 94, and of the strands 58L and 58T (FIG. 16) of the springs 50L and 50T. Moreover, the lower face 148 (FIG. 11) of a central foot 150 of the cover 26 pinches a facing part of the flex cable after hot crimping of the studs 152 (FIG. 10) for mounting and fixing the cover 26 onto the housing main part 24.

Pinching also occurs by the lower edge 111 (FIG. 11) of the partition 110 of the cover which can be completed with complementary shapes (not represented) such as bumps and/or complementary hollows, formed in the edge 111 and/or in the facing part of the facing bottom 74.

By hot crimping of ribs 154L, 154T (FIG. 4) formed in the housing bottom 72, 74 onto the flex cable 28 after the latter is placed in the bottom, the tensile strength of the flex cable 28, 120 is increased.

In a trackball contact device applicants have designed, the length of the housing is 12 mm, its transverse width is 12 mm and its height is 8.8 mm. The diameter of the ball 30 is 8 mm, and it projects on the order of 2.1 mm above the upper face of the cover 26.

The embodiment of the trackball shown in FIGS. 21 and 22 comprises a housing lower part 24 whose bottom is overmolded around the fixed contacts which have projecting tails BA. The tails in FIG. 21 extend transversely T and are arranged with three at each opposite side of the housing. The tails BA are joined to fixed contacts in the housing bottom 74 (FIG. 22) by bands FA embedded in the insulating molding material of the lower part. This symmetric and transverse design of the tails facilitates the cutting-out of the fixed contacts from the same band of metal with the shortest parts.

The balanced distribution of the two series of three outputs allows auto-centering of the device on the printed circuit board during reflow soldering. This control of the soldered position of the trackball device on the printed circuit board is especially important since the ball must be centered with respect to the circular hole for the passage of the ball in the shell of the telephone.

The housing lower part 24 no longer includes any opening 108, provided for the passage of the flex cable, and it includes two opposite walls 106T.

Figure 25:
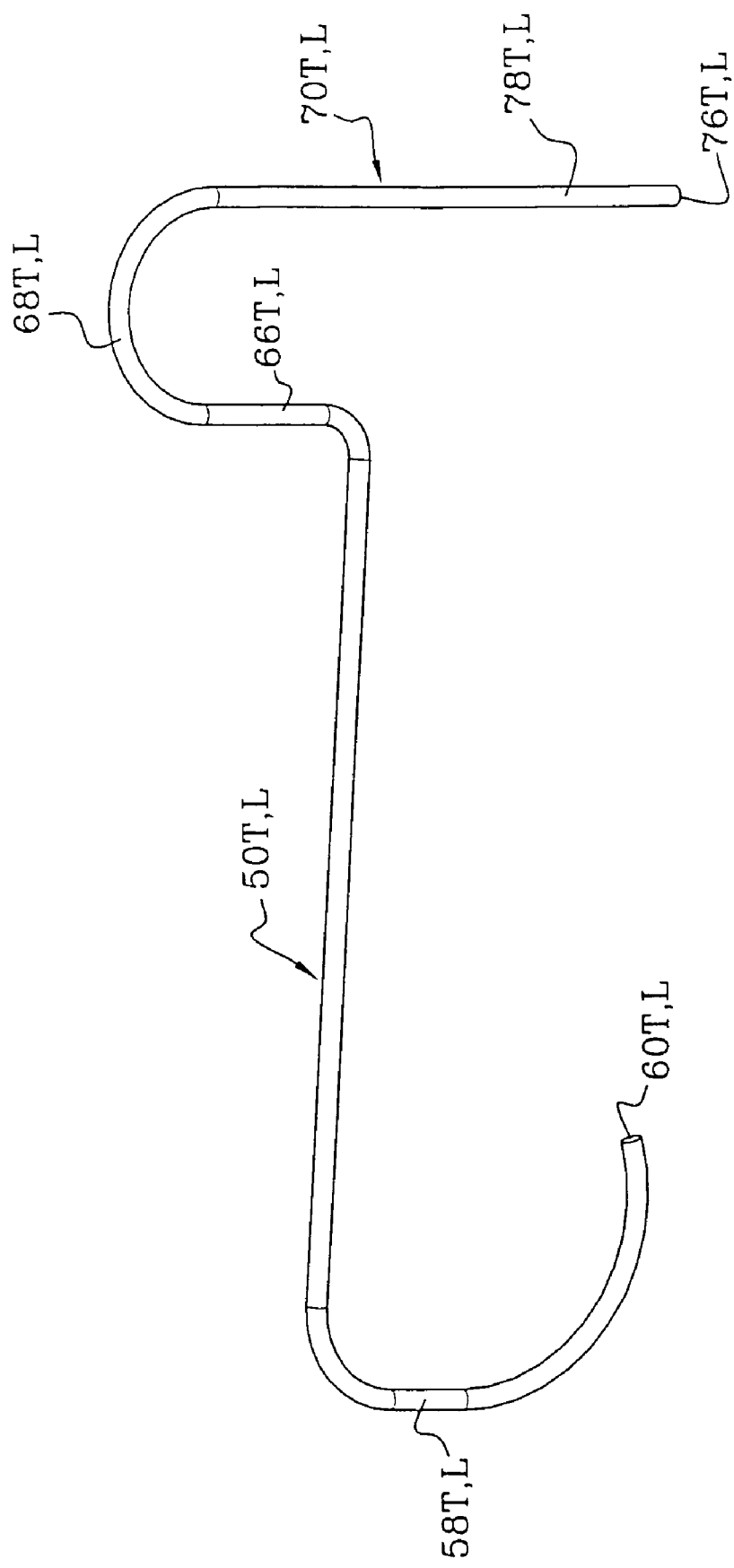
FIG. 25 is a front elevation view illustrating a variant of the contact spring and rod of the present invention.
Figure 26:
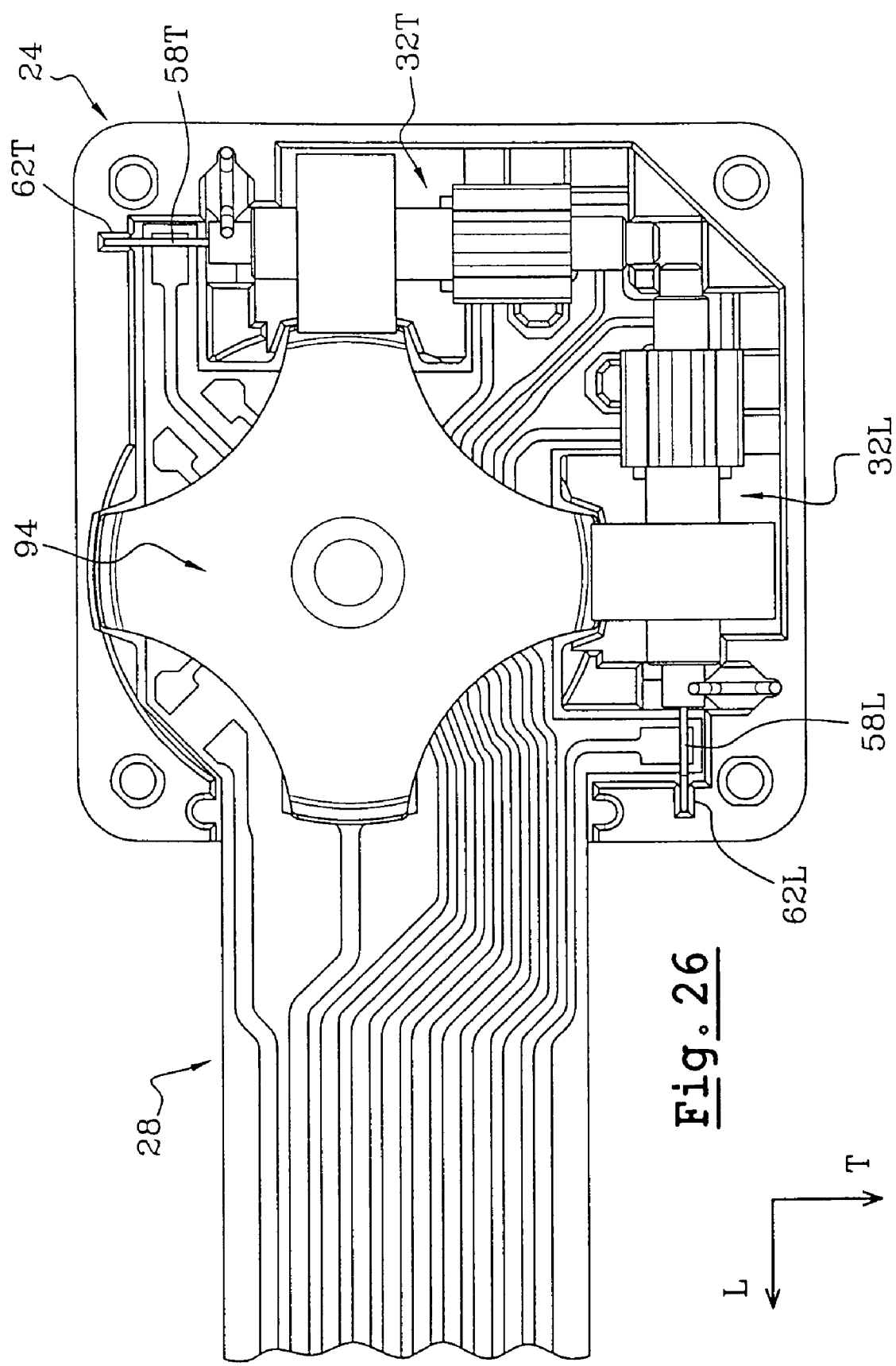
FIG. 26 is a view similar to the one of FIG. 16 with the two contact springs and rods in the housing, according to the variant of FIG. 25.
Figure 27:
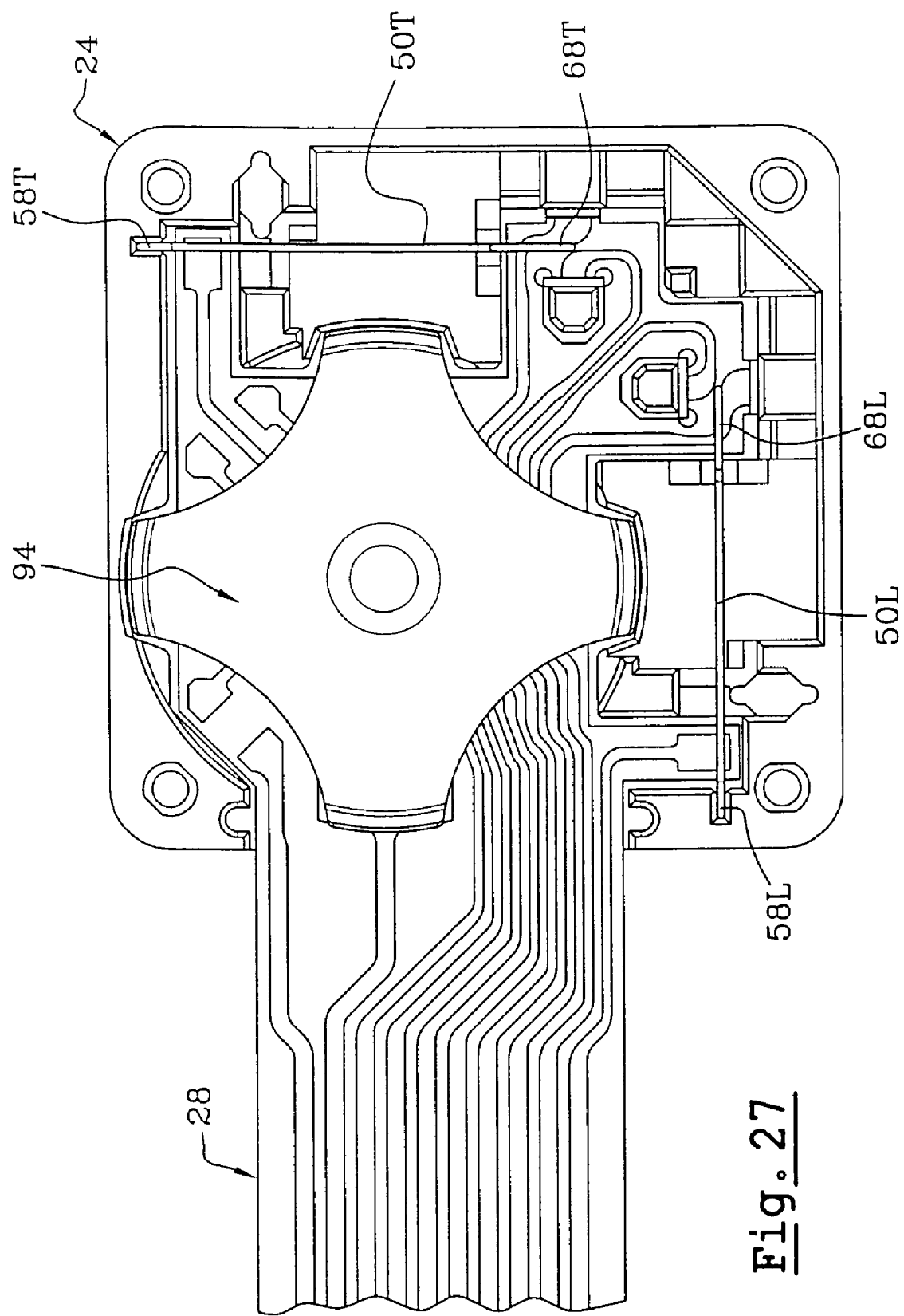
FIG. 27 is a view similar to the one of FIG. 26 without the coding shafts.
Figure 28:
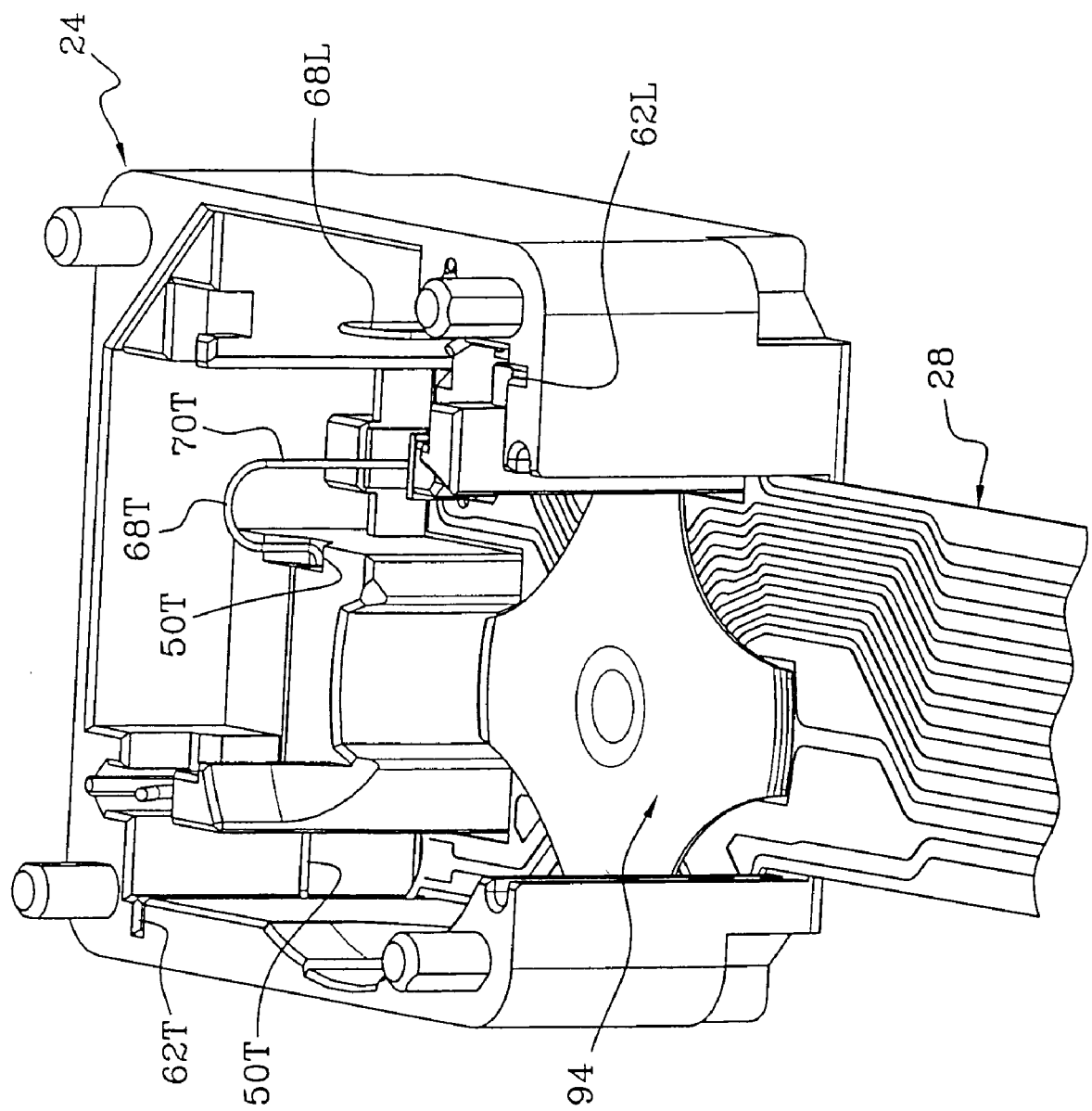
FIG. 28 is an isometric view similar to FIG. 19 showing the arrangement of FIG. 27.
Figure 29:
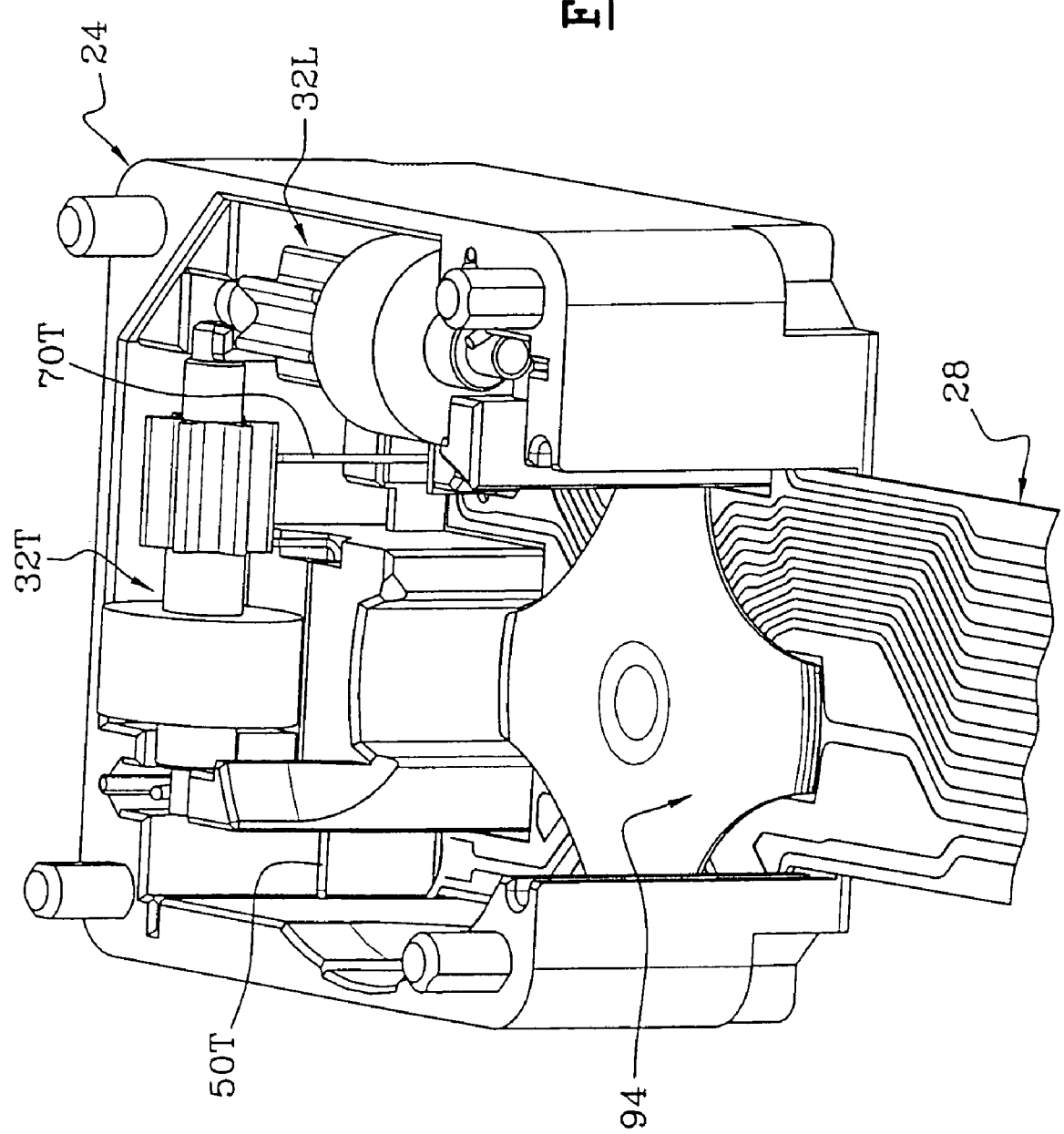
FIG. 29 is a view similar to FIG. 20 showing the arrangement of FIG. 27.

As shown in FIGS. 25 and 28, the contact springs and rods 50L, 50T–70L, 70T can be realized in the form of a single symmetric element which can be used either as a longitudinal or transverse one 50L, 50T–58L, 58T–68L, 68T–70L, 70T.

Depending upon the size of the housing, the general length of the spring-rod element might be more or less important. When the ratio between this length and the diameter of the wire it is made of, is greater than about 75 (seventy-five), it is possible to replace the torsion spiral spring whose external diameter is equal to the diameter of the wire.

It is sufficient that the elastic momentum or torque resulting from the cooperation between the loop 68L, 68T and the associated pinion 44L, 44T remains inferior to the driving momentum or torque of the trackball on the roller 42L, 42T.

The spring is thus greatly simplified, as well as the corresponding receiving portions 46L, 46T and 62L, 62T of the lower part 24, and its overall length is reduced as can be seen in FIGS. 23 to 29.

For many uses of a control trackball, it is desirable that the trackball be illuminated. This is the case in GSM telephones or similar wireless telephones, as well as for remote control devices such as those used for video projectors for which the user, who is in a dark or "night" environment needs to know the kind of order sent by the remote control device, for instance by the aid of various colors of illumination of the trackball which might be integrated in the remote control device itself, and/or on the projector.

Known solutions for the illumination of a trackball consist of a light source which is positioned vertically under the bottom of the trackball. However, this cannot be done with the triggering dome 94 under the lower portion of the trackball 30, without increasing the overall height of the device. Also, such light source would result in a complicated arrangement for establishing the entry switching with a conducting lug P1.

Figure 32:
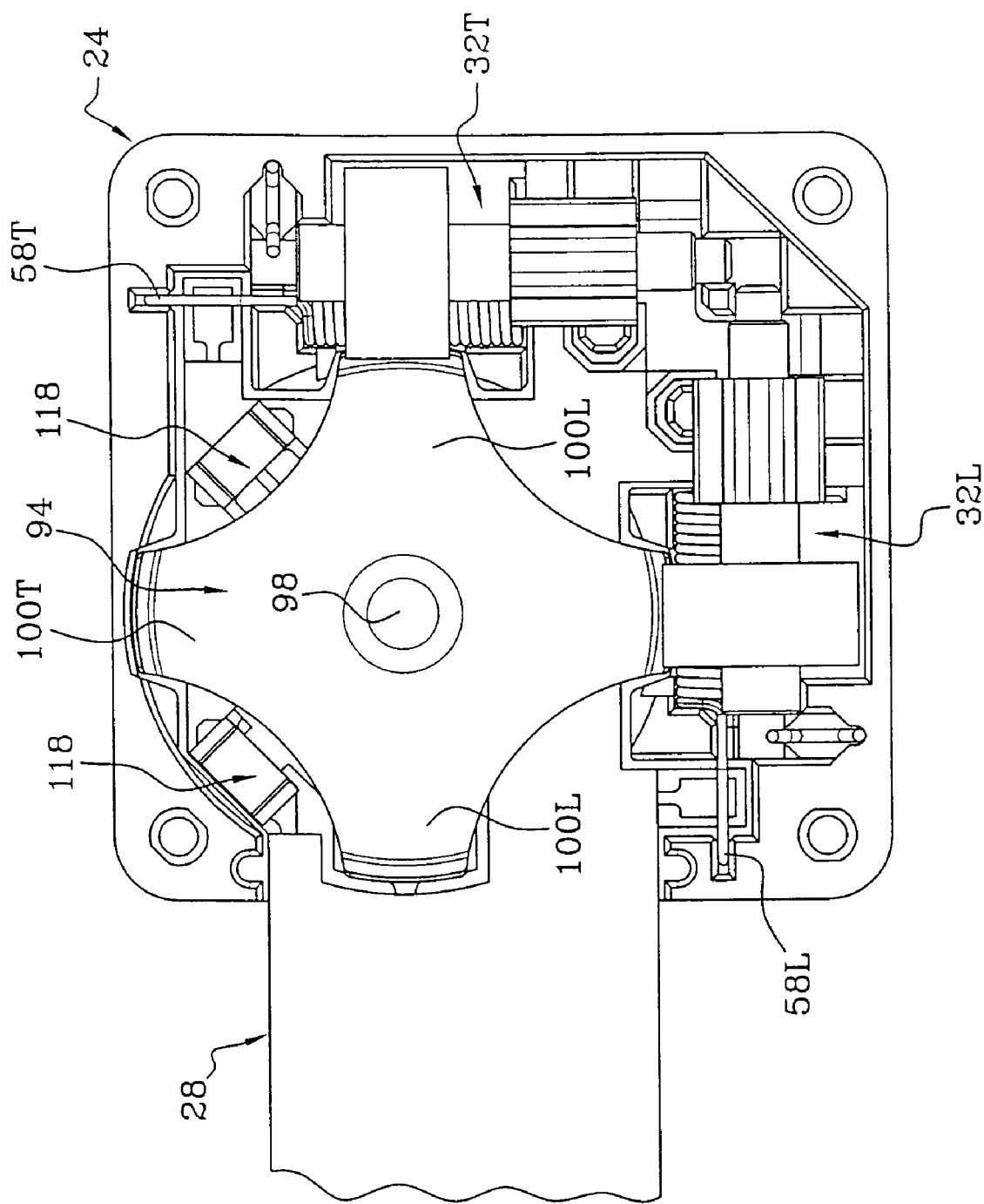
FIG. 32 is a view similar to the one of FIG. 16 of the variant with two LED's.
Figure 33:
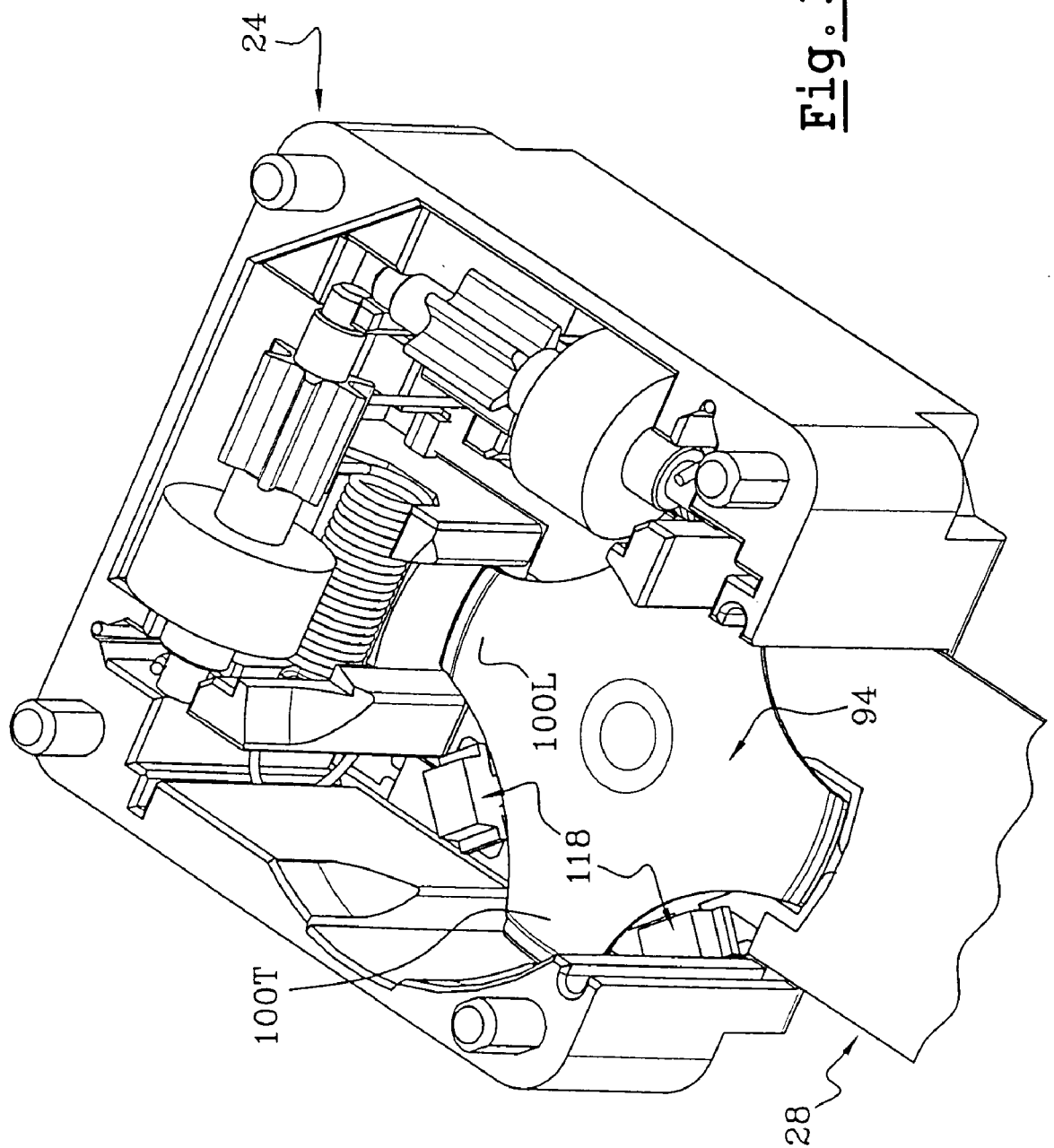
FIG. 33 is an isometric view of the arrangement of FIG. 32.
Figure 34:
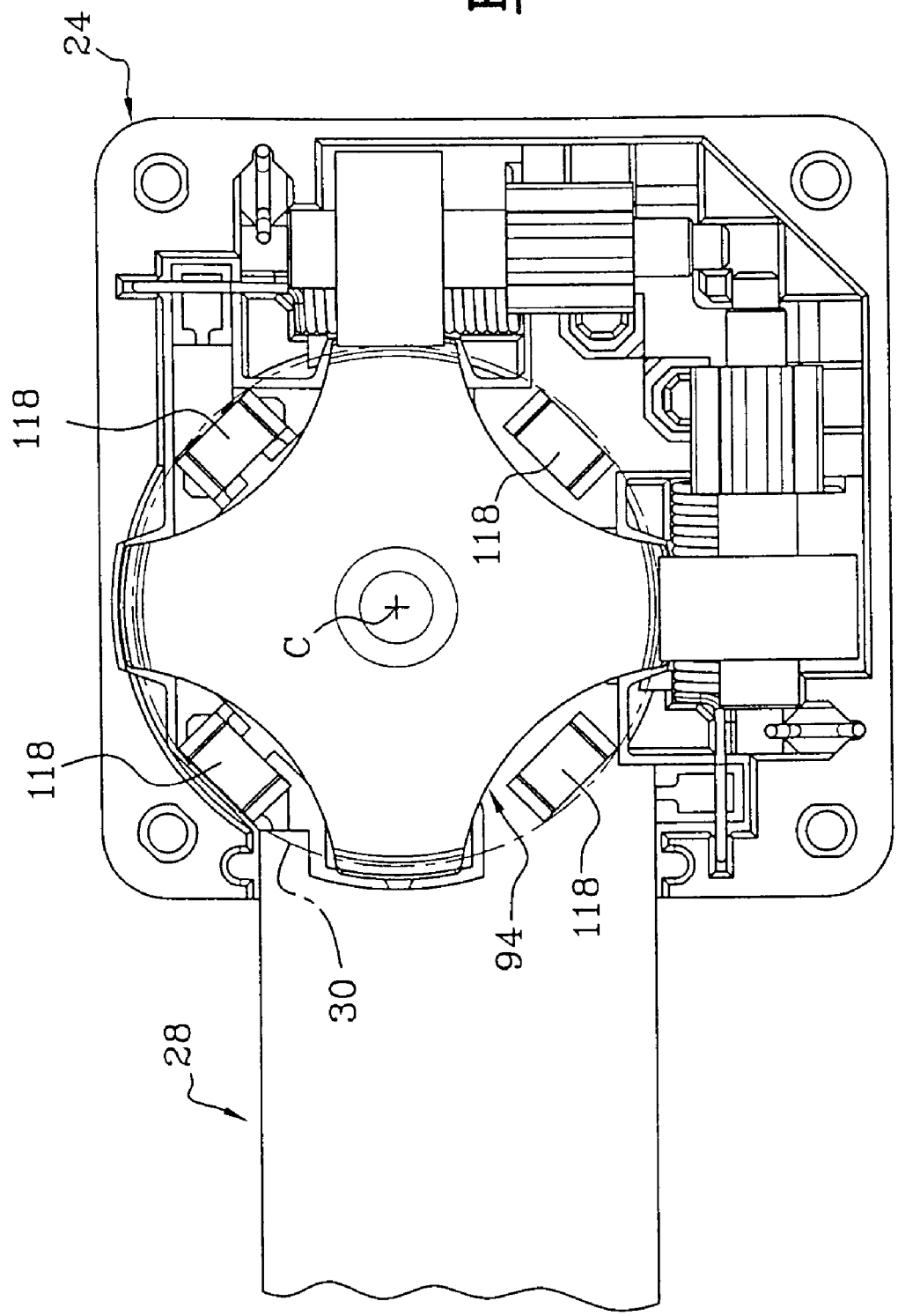
FIGS. 34 and 35 are similar to FIGS. 32 and 33 and show an arrangement with four LED's.
Figure 35:
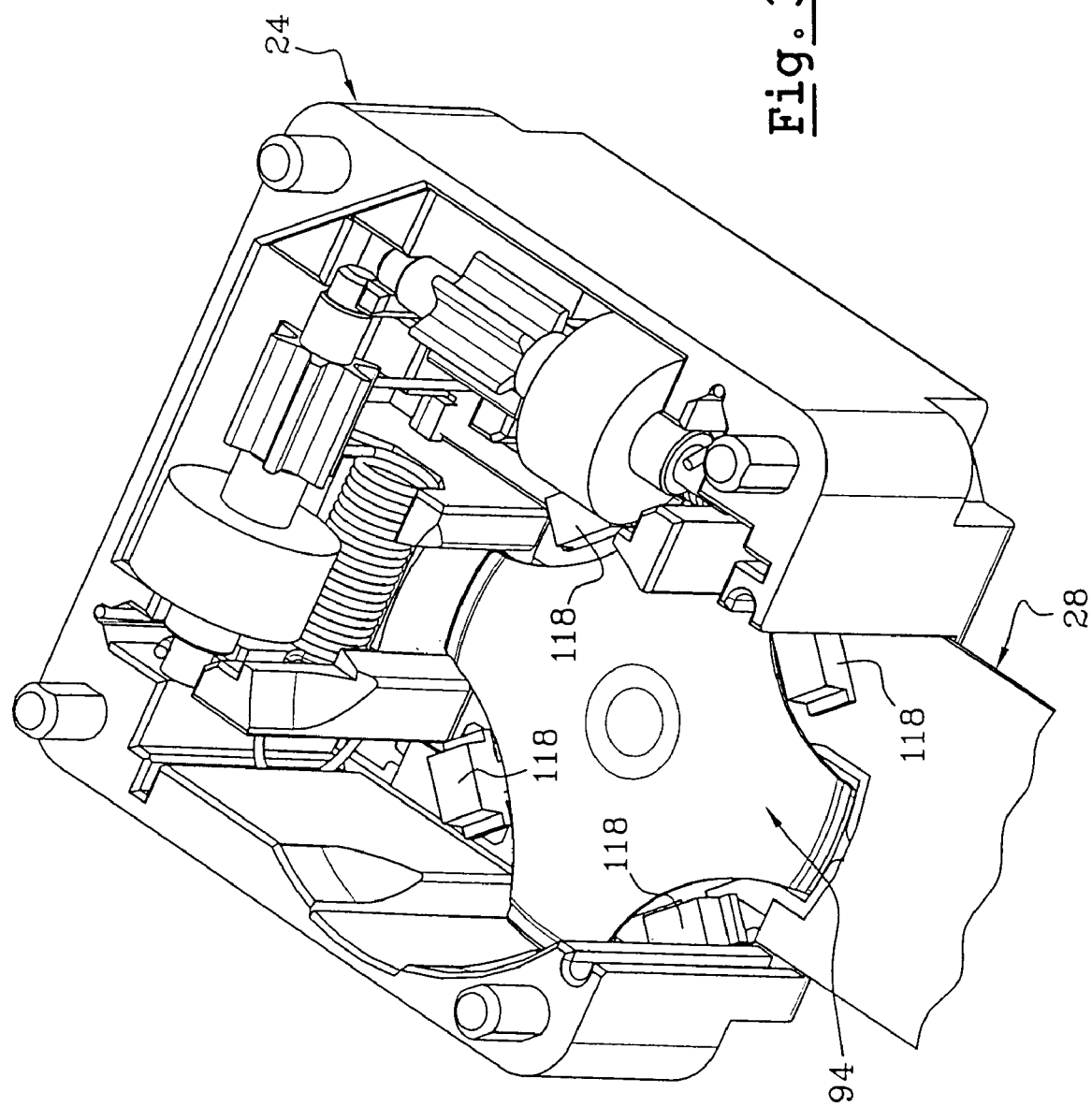

The invention proposes to arrange at least one LED 118 (FIG. 32) between two adjacent radial branches 100L, 100T of the triggering star shaped dome 94. FIG. 32 shows two LED's 118, and it is possible to include four LED's.

Each LED 118 is laterally offset with respect to the vertical axis passing through the center C of the trackball 30, but it is also under most of the ball.

Figure 36:
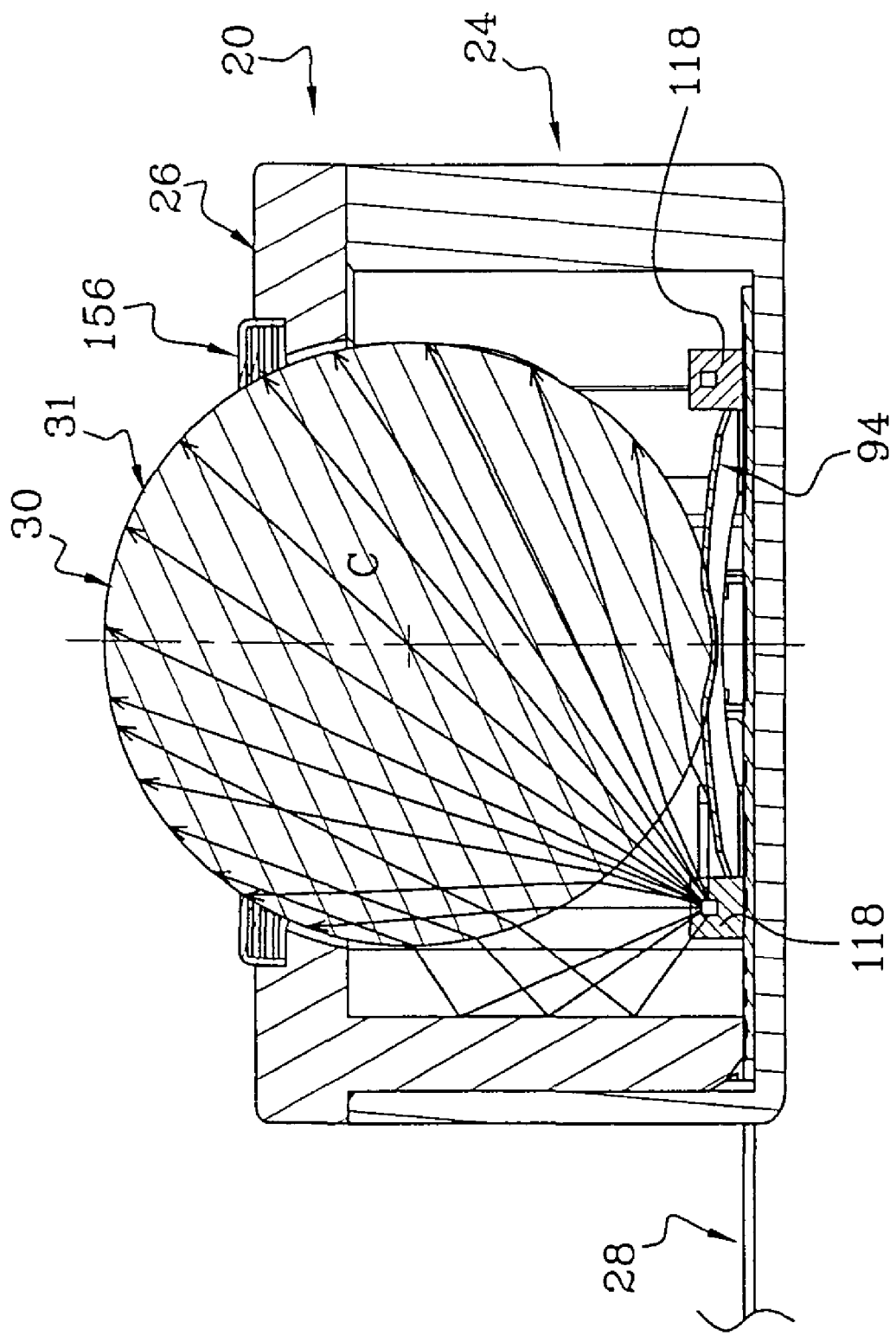
FIG. 36 is a sectional view taken on a vertical plane passing through the center of the trackball and showing the two diametrically opposed LED's.
Figure 40:
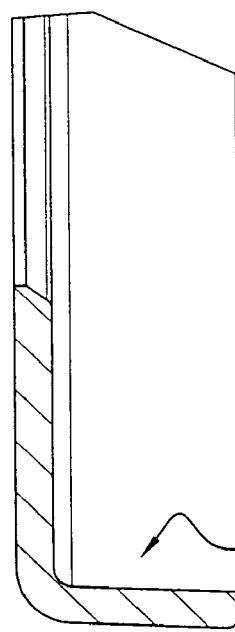
FIG. 40 is an enlarged view of the left portion of the annular wiping element of FIG. 37.
Figure 38:
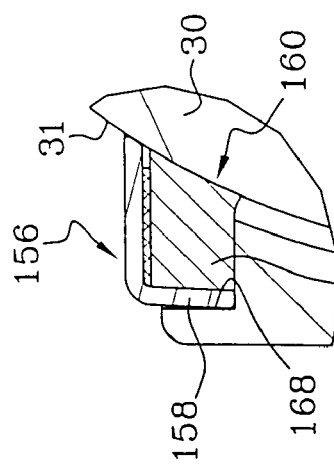
FIG. 38 is an enlarged view of detail D38 of FIG. 37.
Figure 37:
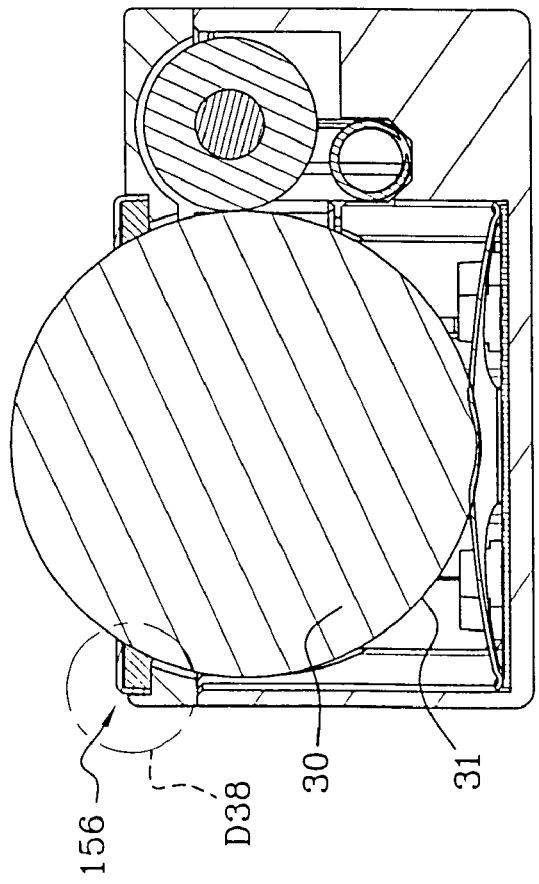
FIG. 37 is a sectional view similar to the one of FIG. 7 showing a variant of the upper part of the housing incorporating means for wiping the trackball.
Figure 39:
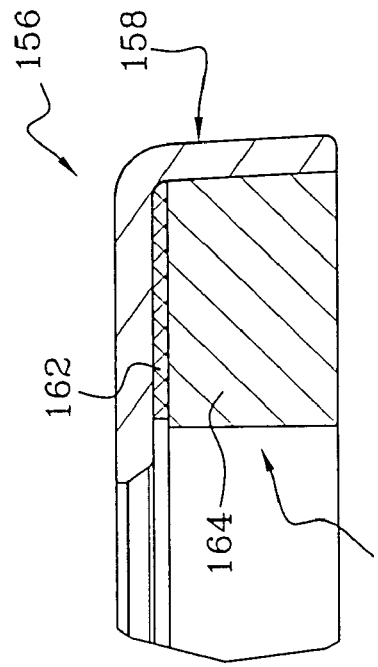
FIG. 39 is an enlarged view of the right portion of the wiping means of FIG. 37 including a metal, cup shaped, annular casing, and an annular wiping element in the form of a washer.

The material of which the external layer of the ball, or the whole ball, is made of is preferably semi-transparent, or translucent, so the light is diffused. The rays of light, as shown in FIG. 36, may pass directly through the ball, or after reflection on the various surrounding walls of the housing and on the upper face of the dome 94 which is made of stainless steel.

Figure 30:
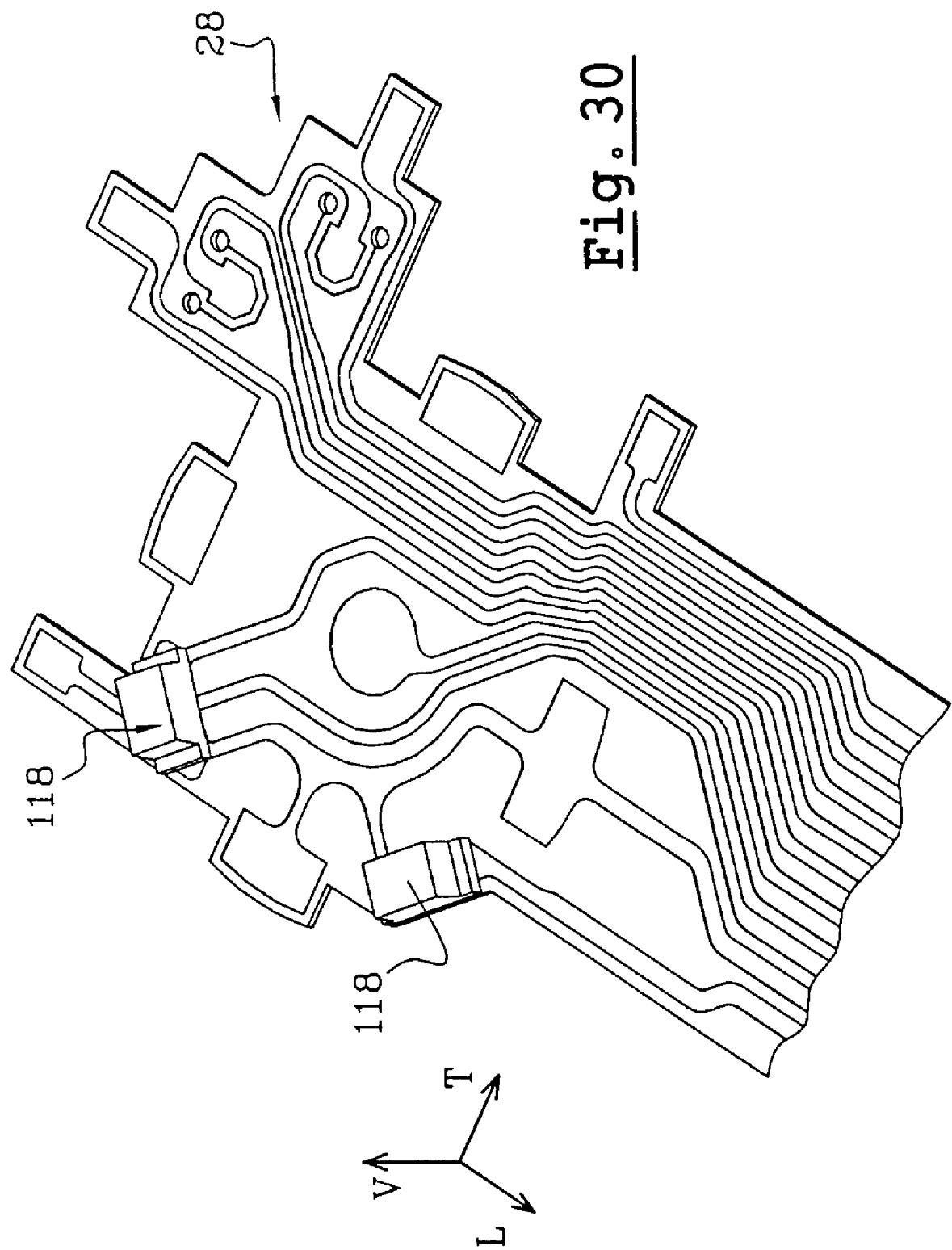
FIG. 30 is an isometric view of a portion of a variant of the flat flexible cable, which supports two light emitting diodes (LED's) for illuminating the trackball, the entire flat flexible cable being shown without its upper insulation layer.
Figure 31:
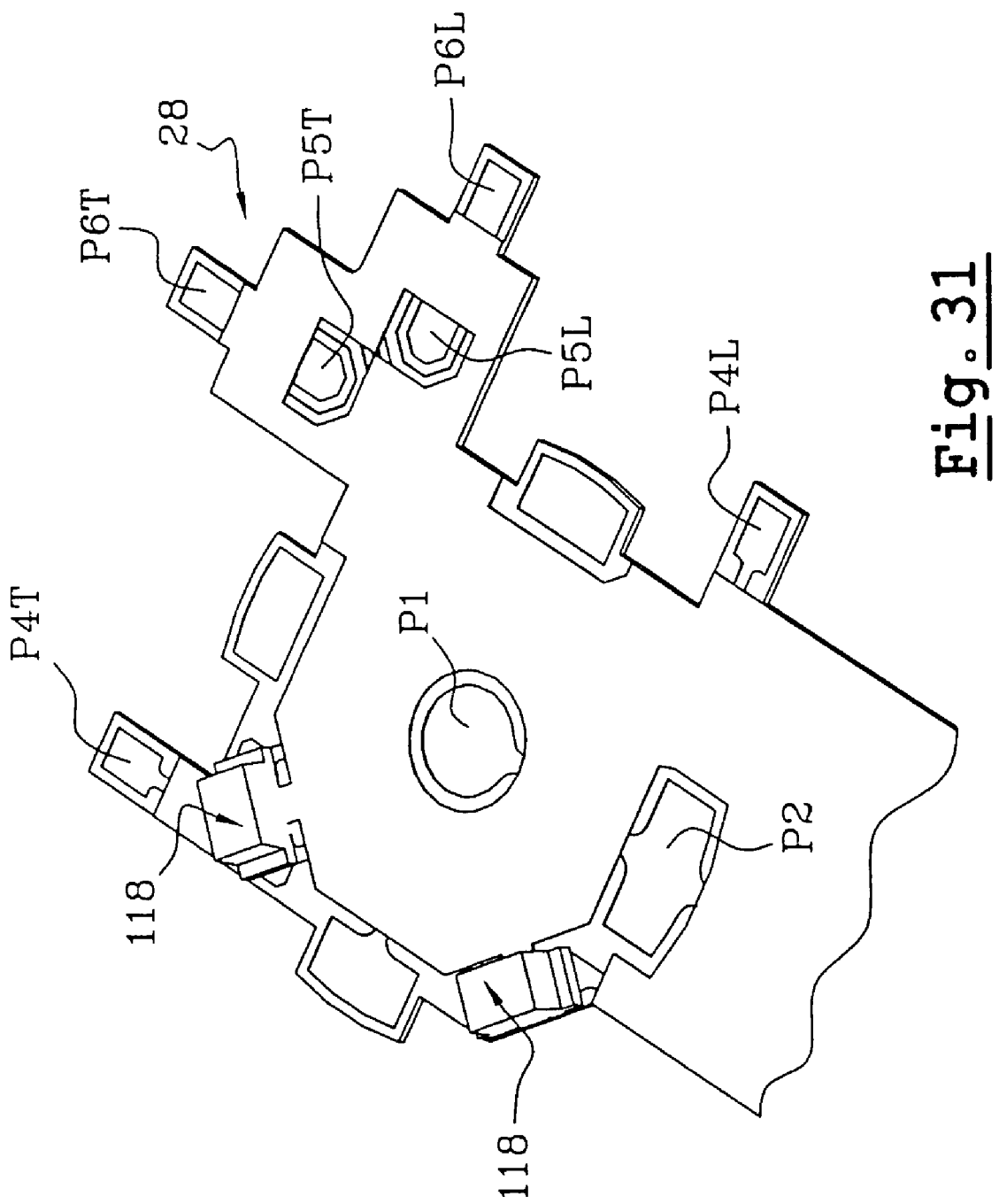
FIG. 31 is a view similar to the one of FIG. 30 with the flat flexible cable illustrated with its upper insulation layer.

The implementation of the LED's is particularly simple and advantageous with the use of the flex flat cable 28 on which the LED's are soldered thereon. The LED's are soldered in place before the assembly of the various components of the device as shown in FIGS. 30 and 31 in which one pair of LED's 118 is shown. One or two LED's imply only a small increase of the price of the flex cable 28. The use of three or four LED's implies a design of the flex cable with narrow and close conducting tracks to bring them power.

When the contacts are overmolded, as shown in FIGS. 47 to 50, the LED's are soldered, or glued with a conductive glue, in the bottom of the housing before assembly of the various components of the device.

Depending on the desired intensity of illumination o the trackball 30, the input current for each LED is between 5 and 20 mA.

The illumination of the ball might also constitute a "feedback" information for the user, for instance for indicating to the user the orientation or direction, and/or the sense of rotation of the ball, thus "guiding" the user. For performing such a "guidance" of the user, it is possible to modify the intensity of the illumination, the colors, the frequency of flickering, etc. and combinations of these parameters. The light emitted by a LED might be yellow, red, green, orange or blue.

In one example we may assure that the cursor must be displaced on the screen by an angle of 30° with respect to the horizontal "X" axis and by a distance of 15 mm.

The light signal emitted by the ball, which is governed by the software of the apparatus equipped with the trackball device, might be such that the duration of the "ON" and "OFF" switched states are as follows:

They are identical if the ball is rotated in the plane passing by this angle of 30° (ratio of Y/X=1);

The duration of "OFF" is greater than the duration of "ON" (ratio of Y/X >1) if the ball is rotated with an angle too far from the "X" axis;

The duration of "ON" is greater than the duration of "OFF" (ratio of Y/X <1) if the ball is rotated with angle too close with the "X" axis;

The flickering frequency, or a light intensity is related to the remaining distance for the cursor to travel.

The light signal is "fixed" ("ON" or "OFF") when the cursor has reached its correct final position.

The color or the intensity is changed after entry.

In the example of FIG. 6, a peripheral seal 136 with a lip 138, which is overmolded with the cover 26, has been illustrated. This seal 136 may also be glued on the cover or upper part 26.

Another solution, illustrated in FIGS. 37 to 43 consists in replacing the seal 136 by a wiping and sealing means 156 comprised of a metal cup shaped annular casing 158 and of an annular wiping element 160 made in the form of a washer which is for example a compound or sandwich of felt and "Teflon" (tetra-fluoric-ethylene).

In the example of FIGS. 37 to 41, a layer of glue 162 is provided for fixing a single layer of felt 164 inside the annular metal casing 158. The felt layer provides a wiping or cleaning of the surface 31 of the trackball 30 when the latter rotates with respect to the wiping element 160.

Figure 42:
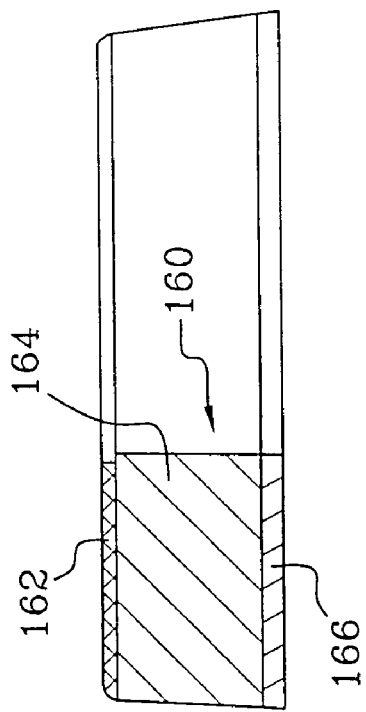
FIGS. 42 and 43 show two variants of the wiping element of FIG. 37.
Figure 41:
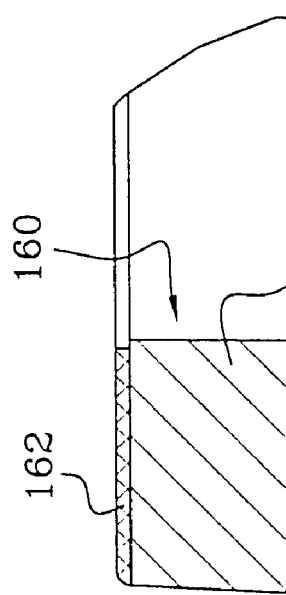
FIG. 41 is an enlarged view of the left portion of the annular wiping element of FIG. 37.
Figure 43:
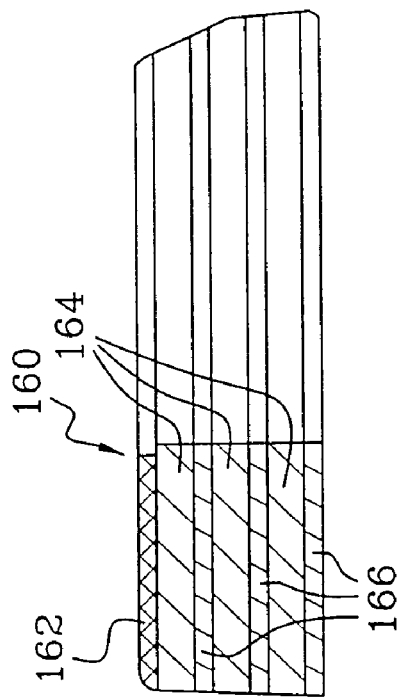

The wiping element 160 can be a multi-layered one including various numbers of felt layers 164 and of Teflon layers 166 as shown in FIGS. 42 and 43. Each layer of Teflon performs a sealing role or function in order to prevent the entrance of particles created during the wiping of the surface 31, into the housing.

The total thickness of the wiping element 160 is about 0.5 mm. The element 160 also constitutes a "static" seal in order to prevent the penetration of dust inside the device.

The two materials, felt and Teflon, provide a soft friction on the surface of the ball.

The annular casing 158 can be mounted by force or press fitting in the corresponding cavity 168 of the upper portion 126 of the housing. This is the case when the wiping means are provided one time for the whole life of the product.

However, the casing may be mounted loose in the cavity, i.e. with a radial play. It is then possible to have it as a disposable element and to replace it for maintenance purposes.

In this case, the casing 128 is held in place in the cavity 168 by a superior hood 170 shown in FIGS. 44 to 46. The hood 170 might be a portion of an upper cover element belonging to the electronic apparatus equipped with a trackball according to the invention.

The difference between the diameter of the opening 172 (FIG. 44) in the hood and the diameter of the ball in this plane, leaves an annular portion of the upper annular metallic face 159 of the casing 158 which provides an attractive visual effect seen from the outside of the apparatus.

The whole device 20B (FIG. 46) may be elastically fitted under the hood 170, i.e. by means of elastic tangs 174 with hooks as shown in FIG. 46.

The user, who rotates the trackball to "navigate" on the screen, provides the very low energy which is necessary for the wiping of the ball. Thus, the wiping or cleaning is continuous and permanent when the ball rotates in order to eliminate the pollution little by little as it appears on the outside portion of surface 31 the ball 30.

The nature of the surface material of the ball is another major parameter for the efficiency of the wiping of the ball. According to the invention, it is necessary that this material be chosen so that it has a natural propensity not to have the pollution stick to the surface 31 of the ball 30.

It is possible to apply surface treatments to the ball, more or less in depth. It is also possible to impregnate the felt with a repellent product or substance such as a hydrophobic or "oil phobic" product.

Applicant has determined that the surface material of the ball should have a low surface tension.

More preferably, the surface tension should be less than 32 mN/m (32 millinewton per meter). "Delrin" material from Du Pont de Nemours is an example of such a material convenient for making the surface of the ball, and also the whole ball in one piece.

Figure 47:
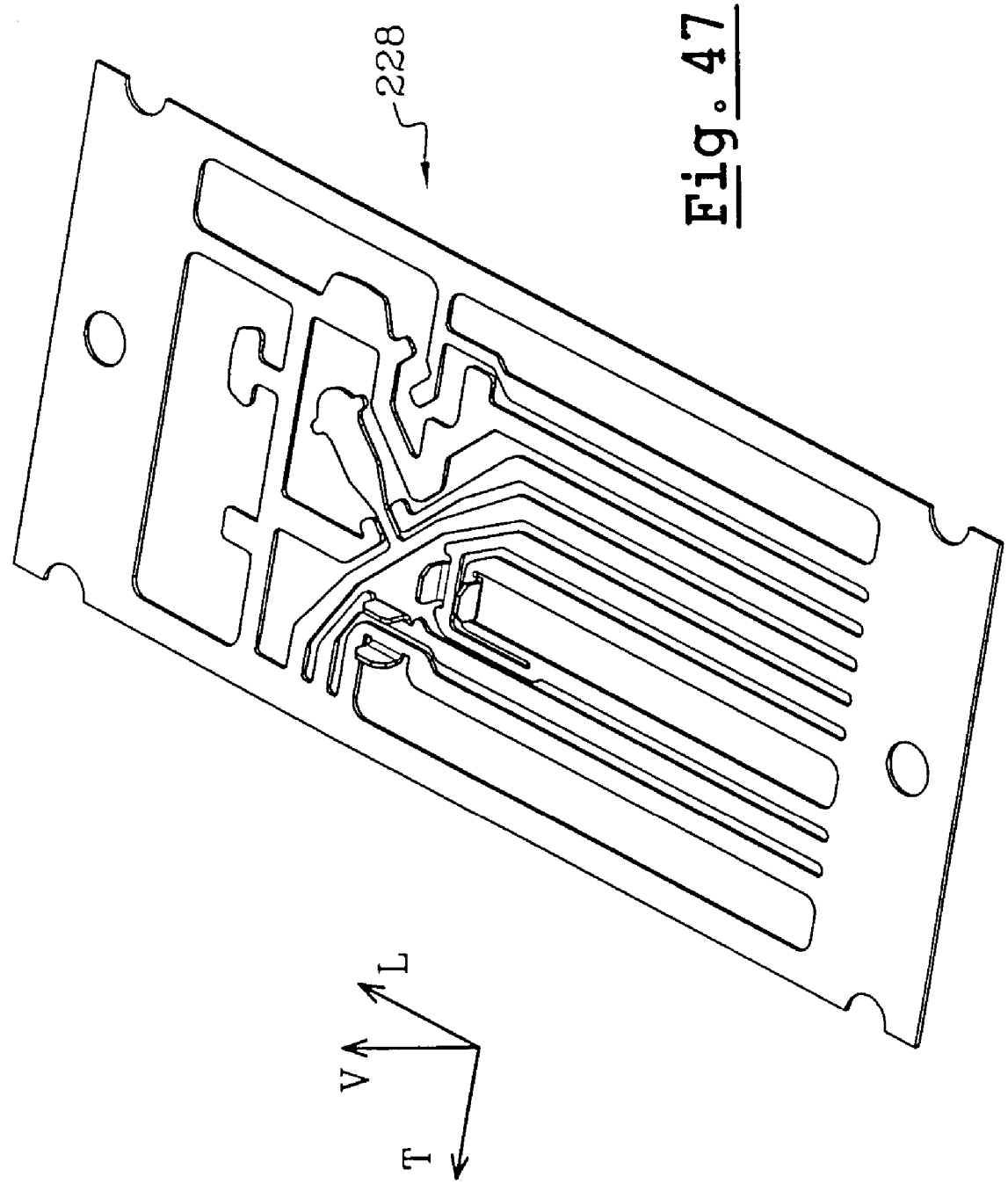
FIG. 47 is an isometric view of a frame that bears contact pads, and that is a variant of a device of the type shown in FIGS. 21 and 22.
Figure 48:
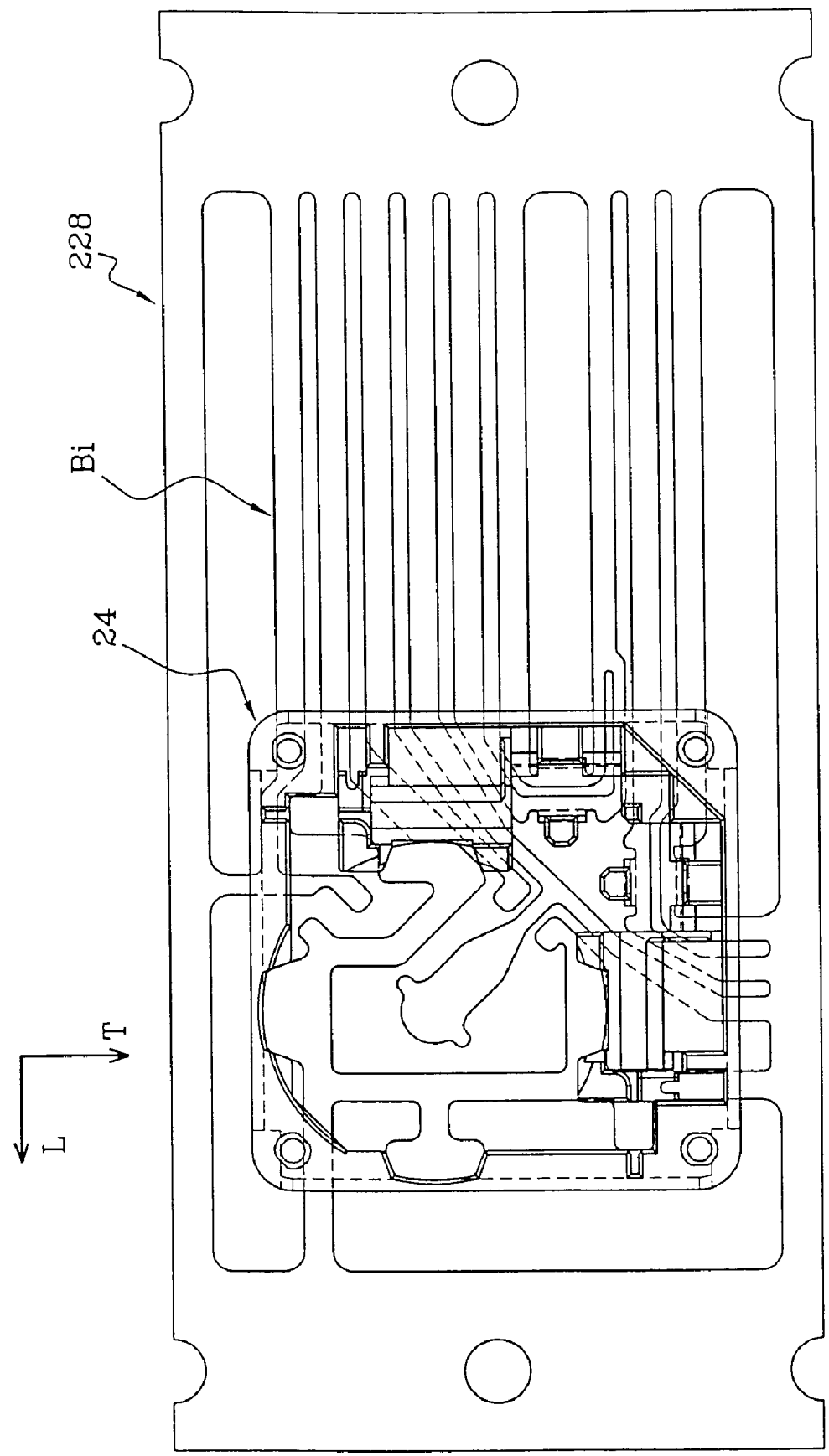
FIG. 48 is a plan view showing the contact pads of FIG. 47 after the overmolding of the corresponding lower part of the housing.
Figure 49:
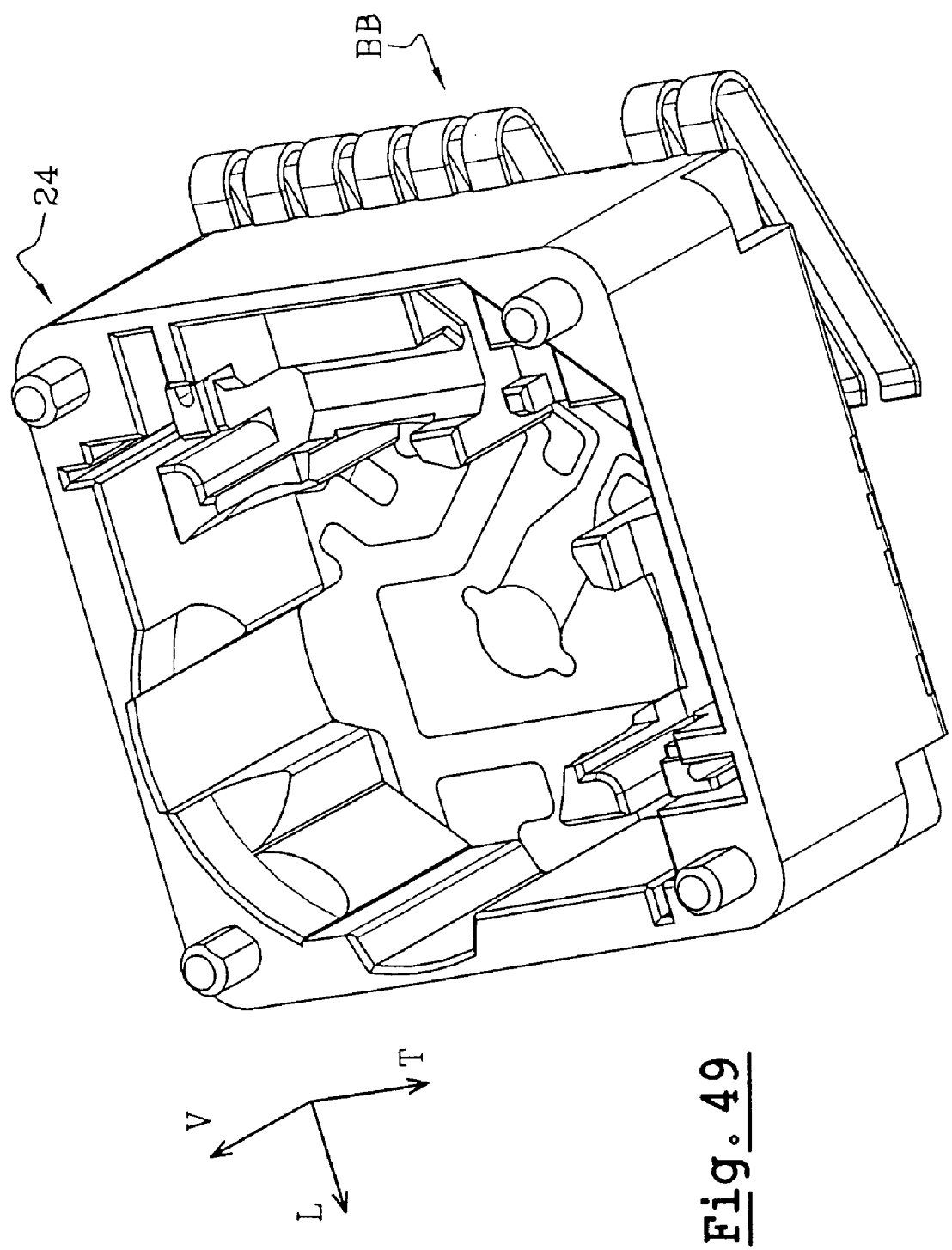
FIG. 49 is an isometric view of the arrangement of FIG. 48 after the cutting out operations and the bending of the terminals in a first example of "pressure contact tabs".
Figure 50:
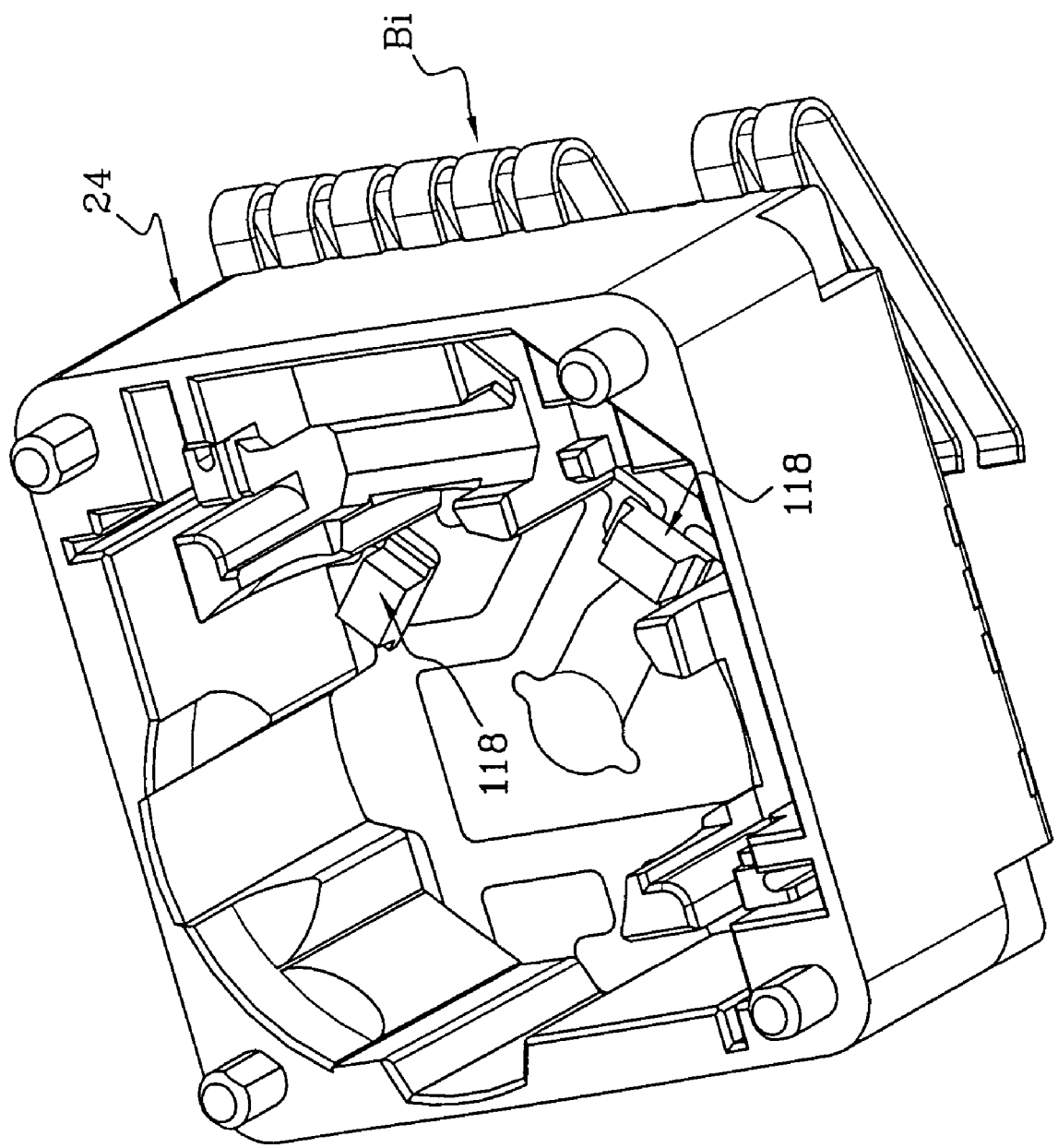
FIG. 50 is a view similar to the one of FIG. 49 with two LED's.

FIG. 47 shows another example of a frame 228 of various contacts and lead connections, of the type used in FIGS. 21 and 22, on which the lower part 24 is overmolded as shown in FIG. 48. Such a construction allows all of the terminal tabs and other contacts to lie on the same lateral side of the housing of the device 20, in the form of a single row of tabs. This allows saving of space on the circuit board of the apparatus which receives the trackball device 20.

Figure 51:
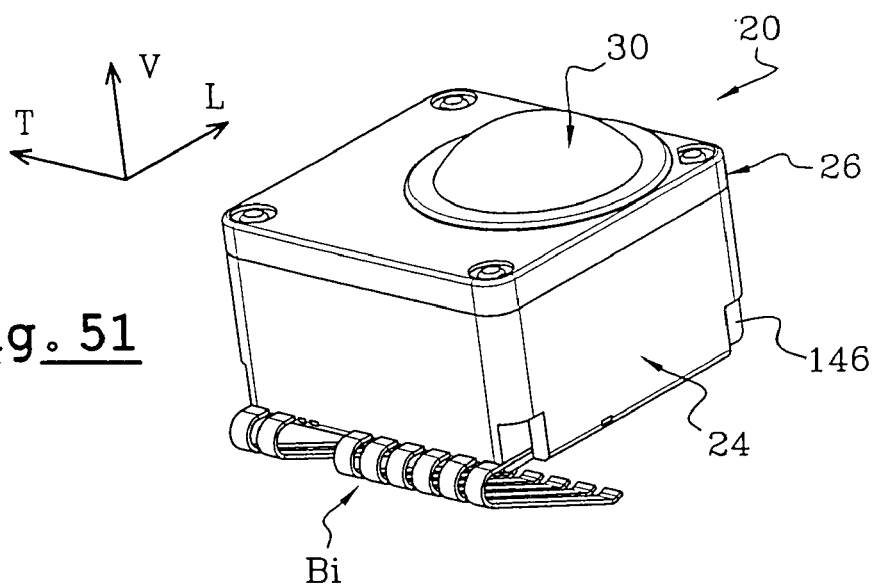
FIG. 51 is an outside isometric view of the complete control device including the lower part of FIG. 49.

The tails may be bent in various configurations. For instance they can be shaped like hairpins as at BB in FIGS. 49 to 51. This provides the contact tails BB and others with a significant capacity to be elastically deformed and with an important "travel", thus permitting, for instance, to fix the trackball device under the hood of the apparatus. In this case, it is very simple to be sure that the trackball device is centered with respect to the opening 172 of the hood 170. It also facilitates the "sealing" around the ball.

It is also possible to realize the upper part 26 of the housing of the trackball 20 molded in one piece with the hood 170.

Figure 52:
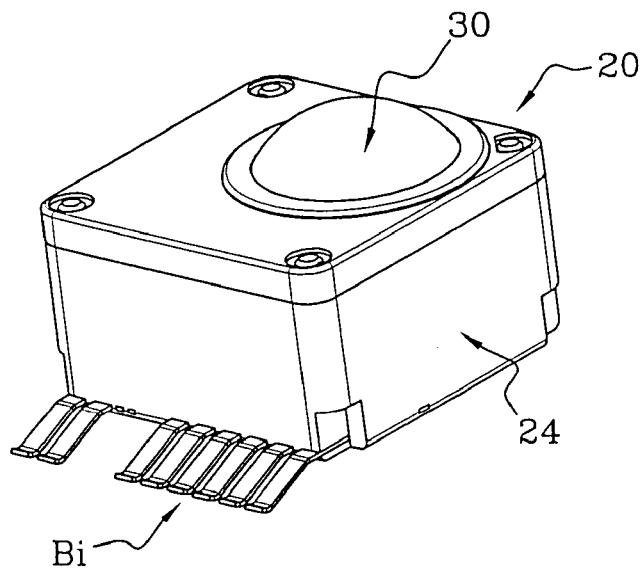
FIGS. 52 and 53 are views similar to the one of FIG. 51 which show two variants of the bent elastic pressure contact tabs.

As it can be seen on FIG. 52, the tails BC may extend forward laterally with an altitude of their free ends depending on the position of the lower face of the lower part 24 with respect to the upper face of the printed circuit board.

Figure 53:
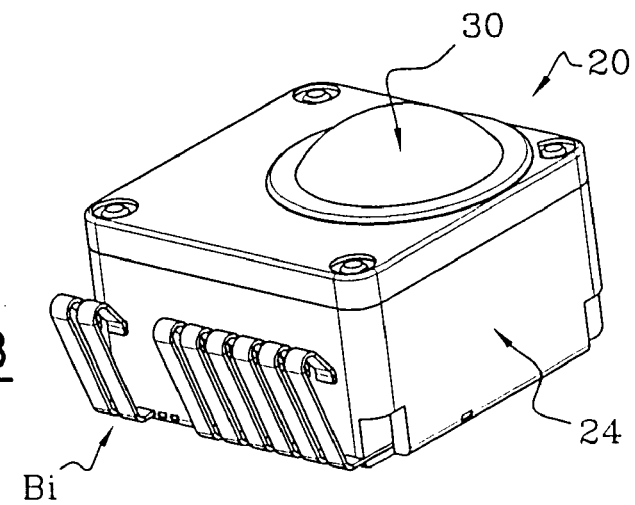

According the solution of FIG. 53, the tabs are bent laterally and upwardly for when there is no sufficient place to vertically superpose the trackball device and a printed circuit board.

Although terms such as "upper", "lower", etc. have been used to describe the relative orientations of the parts of the invention, the invention can be used in any orientation with respect to the Earth.

The novel features of the invention are set forth with particularity in the appended claims. The invention will be best understood from the following description when read in conjunction with the accompanying drawings.

What is claimed is:

1. A trackball control device comprising a housing, two coding shafts pivotally mounted on said housing about perpendicular axes, a trackball rotatably mounted in the housing and engaged with said shafts to pivot them, and two control signal generators, wherein each of said control signal generators comprises:
   a pair of pinions, each having multiple teeth and each coupled to one of said coding shafts to rotate as the corresponding coding shafts rotates;
   a pair of deflectable members that each has a first member part lying between a pair of teeth of a corresponding one of said pinions and biased toward a position between the pair of teeth, so the first member part is repeatedly deflected in first and second opposite directions, and released after each deflection, as the corresponding pinion turns in first and second opposite directions, respectively;
   mean for generating electrical signals in response to deflection of each of said deflectable members.

2. The control device described in claim 1 wherein:
   each of said deflectable members is electrically conductive and has a second member part that moves in primary and secondary directions when the first member part is deflected in said first and second directions;
   said means for generating electrical signals for each deflectable member includes a first contact pad in constant electrical connection with the deflectable member, and a pair of second contact pads each positioned to be engaged by said second member part as it moves respectively in said primary and secondary directions.

3. The control device described in claim 1 wherein:
   each of said deflectable members is a rod that has an upper end forming said first member part and that has a lower end, and each of said rods is pivotally mounted about an axis lying between said rod upper and lower ends, wherein when the rod upper end moves in one direction the rod lower end moves in the opposite direction.

4. The control device described in claim 1 wherein:
   at least a first of said deflectable members is part of a wire of a torsion spring, with one portion of the torsion spring locked against rotation and with a rod part of the spring forming said first deflectable member, said torsion spring biasing said rod part toward said position between a pair of teeth of a pinion.

5. The control device described in claim 4 wherein:
   said rod part merges with an end turn of said torsion spring, and said rod part has a free end that moves, said means for generating electrical signals detects movement of said free end.

6. The control device described in claim 1 wherein:
   said housing includes a housing main part and a cover that together form a housing cavity, said housing main part having a bottom wall with a primarily flat upper face;
   a flat flex cable having a rear portion lying in said housing, with a majority of said rear portion lying facewise against said bottom wall, said flat flex cable rear portion having a plurality of exposed contact pads lying in said housing including at least one contact region electrically connected to each of said deflectable members, said flat flexible cable extending forwardly out of said housing.

7. The control device described in claim 6 wherein:
   said housing main part bottom wall has a pair of upstanding projections, and said flat flex cable has a pair of tabs holding exposed contact pads each tab being bent at about a right angle from said majority of said cable rear portion and each tab lying against one of said projections, so the tab can resist sideward forces pressing them toward the projections.

8. The control device described in claim 1 including:
   a plurality of resilient biasing elements, each including a piece of sheet metal with a middle having about a 180° loop, one end pressing against the housing, and an opposite end pressing one of said shafts against said trackball.

9. The control device described in claim 1 wherein:
   said axes of said coding shafts lie in a horizontal plane, and said trackball has a center lying below said plane.

10. A trackball control device comprising a housing, two coding shafts pivotally mounted on said housing about perpendicular axes, a trackball rotatably mounted in the housing and engaged with said shafts to pivot them, and two control signal generators, wherein each of said control signal generators comprises:
    a pinion having multiple teeth and coupled to a selected one of said coding shafts to rotate with the selected coding shafts;
    a metal wire forming a spring with a first end fixed to said housing and a second end having a proximal part biased toward a position between a pair of teeth of said pinion so said proximal part is deflected in right and left directions as said pinion turns in first and second directions, respectively;
    said spring second end has a distal part that extends from said proximal part and that is moved in first and second directions as said proximal part moves in said right and left directions;
    common, first and second electrical terminals, said common terminal being continuously connected to said spring and said first and second terminals lie in the path of said distal part to contact said distal part when it moves in said first and second directions.

11. The control device described in claim 10 wherein:

said housing has a bottom wall with a flat surface and a slit leading from outside the housing to said flat surface;

a flexible flat cable connecting said control signal generators to said second electronic device, said cable extending through said slit and having a cable in-housing portion lying on said bottom wall flat surface;

said cable in-housing portion having a plurality of exposed contact pads, and said signal generator has terminals directly engaged with a plurality of said contact pads.

* * * * *